(12) United States Patent
Hiramoto et al.

(10) Patent No.: US 8,654,798 B2
(45) Date of Patent: Feb. 18, 2014

(54) BARRIER SYNCHRONIZATION APPARATUS, BARRIER SYNCHRONIZATION SYSTEM, AND BARRIER SYNCHRONIZATION METHOD

(75) Inventors: Shinya Hiramoto, Kawasaki (JP);
Yuichiro Ajima, Kawasaki (JP);
Tomohiro Inoue, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 572 days.

(21) Appl. No.: 12/582,119

(22) Filed: Oct. 20, 2009

(65) Prior Publication Data

US 2010/0124241 A1 May 20, 2010

(30) Foreign Application Priority Data

Nov. 19, 2008 (JP) ................................ 2008-295115

(51) Int. Cl.
*H04J 3/06* (2006.01)

(52) U.S. Cl.
USPC .......................................... 370/509; 370/328

(58) Field of Classification Search
None
See application file for complete search history.

(56) References Cited

U.S. PATENT DOCUMENTS

| | | | | |
|---|---|---|---|---|
| 5,928,351 A * | 7/1999 | Horie et al. | ...................... | 712/11 |
| 7,100,021 B1 * | 8/2006 | Marshall et al. | ................ | 712/19 |
| 2008/0109573 A1 * | 5/2008 | Leonard et al. | ................ | 710/24 |

FOREIGN PATENT DOCUMENTS

| | | |
|---|---|---|
| JP | 03-98152 | 4/1991 |
| JP | 7-152712 | 6/1995 |
| JP | 10-49507 | 2/1998 |

OTHER PUBLICATIONS

A Survey of Barrier Algorithems for Coarse Grained Supercomputers; Technical University of Chemnitz; Hoefler et al. 2004.*
A survey—Dec. 2004.*
Extended European Search report issued Feb. 6, 2012 in corresponding EP Patent Application No. 09173531.6.
Eugene D. Brooks III: "The Butterfly Barrier", International Journal of Parallel Programming, vol. 15, No. 4 Dec. 1986, XP002665517. Retrieved from the Internet: URL:http://www.springerlink.com/content/tu5n5165r7883243/.

* cited by examiner

*Primary Examiner* — David Oveissi
(74) *Attorney, Agent, or Firm* — Staas & Halsey LLP

(57) ABSTRACT

A barrier synchronization apparatus includes a receiving device which transmits a first synchronization signal to a synchronization device when the first synchronization signal in which a transmission destination is set in advance according to setting conditions including an algorithm of the barrier synchronization and an execution condition is received. A synchronization device synchronizes n first synchronization signals which are set in advance according to the setting conditions, wherein n is a positive integer, and designates transmission of m second synchronization signals in which transmission destinations are set in advance according to the setting conditions after the synchronization is established, wherein m is a positive integer. A transmitting device transmits the second synchronization signals to m transmission destinations set in advance, when a transmission designation information indicating the transmission designation is received from the synchronization device.

10 Claims, 23 Drawing Sheets

BARRIER SYNCHRONIZATION APPARATUS, BARRIER SYNCHRONIZATION SYSTEM, AND BARRIER SYNCHRONIZATION METHOD

CROSS-REFERENCE TO RELATED APPLICATIONS

This application is based upon and claims the benefit of priority of the prior Japanese Patent Application No. 2008-295115, filed on Nov. 19, 2008, the entire contents of which are incorporated by reference herein.

FIELD

Embodiments of the present invention discussed herein relate to a barrier synchronization apparatus, a barrier synchronization system, and a barrier synchronization method.

BACKGROUND

Barrier synchronization is known as a method of synchronizing a plurality of processes which are executed in parallel with each other. In the barrier synchronization, a barrier point is set. A barrier point is a point at which synchronization is made. A process to perform the barrier synchronization temporarily stops the execution when the execution arrives at the barrier point. The process to perform the barrier synchronization restarts the stopped execution when all the processes subject to the barrier synchronization and executed in parallel arrive at the barrier point. In this manner, synchronization of the parallel execution between the plurality of processes which are executed in parallel can be made.

On the other hand, a reduction operation is known as an arithmetic operation for data held by a plurality of processes. Several reduction operations, for example, an arithmetic operation to calculate a sum of the data and an arithmetic operation to calculate a maximum value and a minimum value, are known. The reduction operation includes an arithmetic operation in which only a specific process has an arithmetic operation result, and an arithmetic operation in which all processes have arithmetic operation results, respectively. However, in any case, since data communication is performed between processes, the reduction operation can be executed by using the same algorithm as that of the barrier synchronization.

A data communication which broadcasts data from a processor to all the other processors, sets up a butterfly barrier in which processors that finally received the broadcast data communicate with each other, and reports from the processors that participated in the butterfly barrier to all the processors that did not participate in the butterfly barrier of termination of data communication, is known.

[Patent Document 1] Japanese Patent Application Laid-Open No. 03-098152

[Patent Document 2] Japanese Patent Application No. 07-152712

During execution of barrier synchronization, depending on algorithms, processes must change destinations of signals indicating that the processes arrive at a barrier point at each stage. Also in the reduction operation, the processes must change destinations of intermediate results of the arithmetic operation at each stage. The inventor of the present invention studied ways to change the destinations at high speed to increase a barrier synchronization speed and a reduction operation speed.

According to the studies, when both barrier synchronization and a reduction operation are realized by software, a destination changing operation on the stages are partially performed by a CPU. For this reason, overhead easily occurs. Therefore, as a result, the speed of the barrier synchronization and the reduction operation cannot be increased.

On the other hand, when the destination changing operation is realized by hardware, the destination changing operation can be performed without the CPU. For this reason, the speed of the barrier synchronization and the reduction operation are expected to be increased. However, depending on configurations of hardware to be employed to the high-speed operation, when a plurality of nodes are connected to each other by a network, a configuration of the network between the nodes may be limited.

SUMMARY

According to an aspect of the invention, a barrier synchronization apparatus includes a receiving device that transmits a first synchronization signal in which a transmission destination is set according to setting conditions including an algorithm of the barrier synchronization and an execution condition to a synchronization device, when receiving the first synchronization, a synchronization device that synchronizes n first synchronization signals which are set in advance according to the setting conditions and, designates transmission of m second synchronization signals in which transmission destinations are set in advance according to the setting conditions after the synchronization is established, and a transmitting device which transmits the second synchronization signals to m transmission destinations set in advance when a transmission designation from the synchronization device is received, wherein n and m are positive integer.

The above-described embodiments of the present invention are intended as examples, and all embodiments of the present invention are not limited to including the features described above.

DESCRIPTION OF EMBODIMENTS

Figure 1:
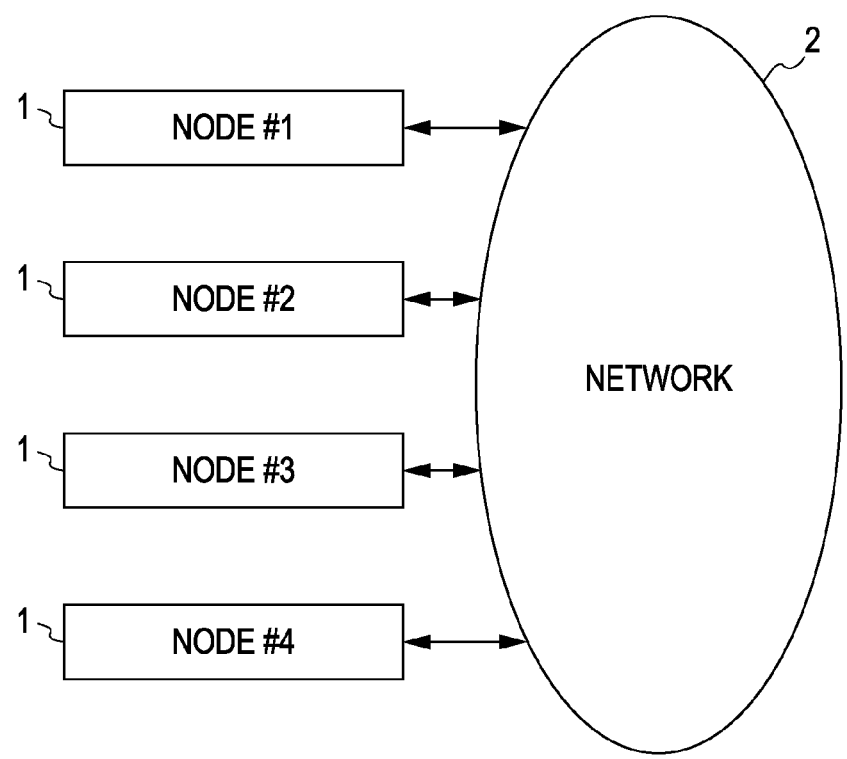
FIG. 1 is a diagram illustrating an example of a connection of nodes.

Reference may now be made in detail to embodiments of the present invention, examples of which are illustrated in the accompanying drawings, wherein like reference numerals refer to like elements throughout.

Figure 2:
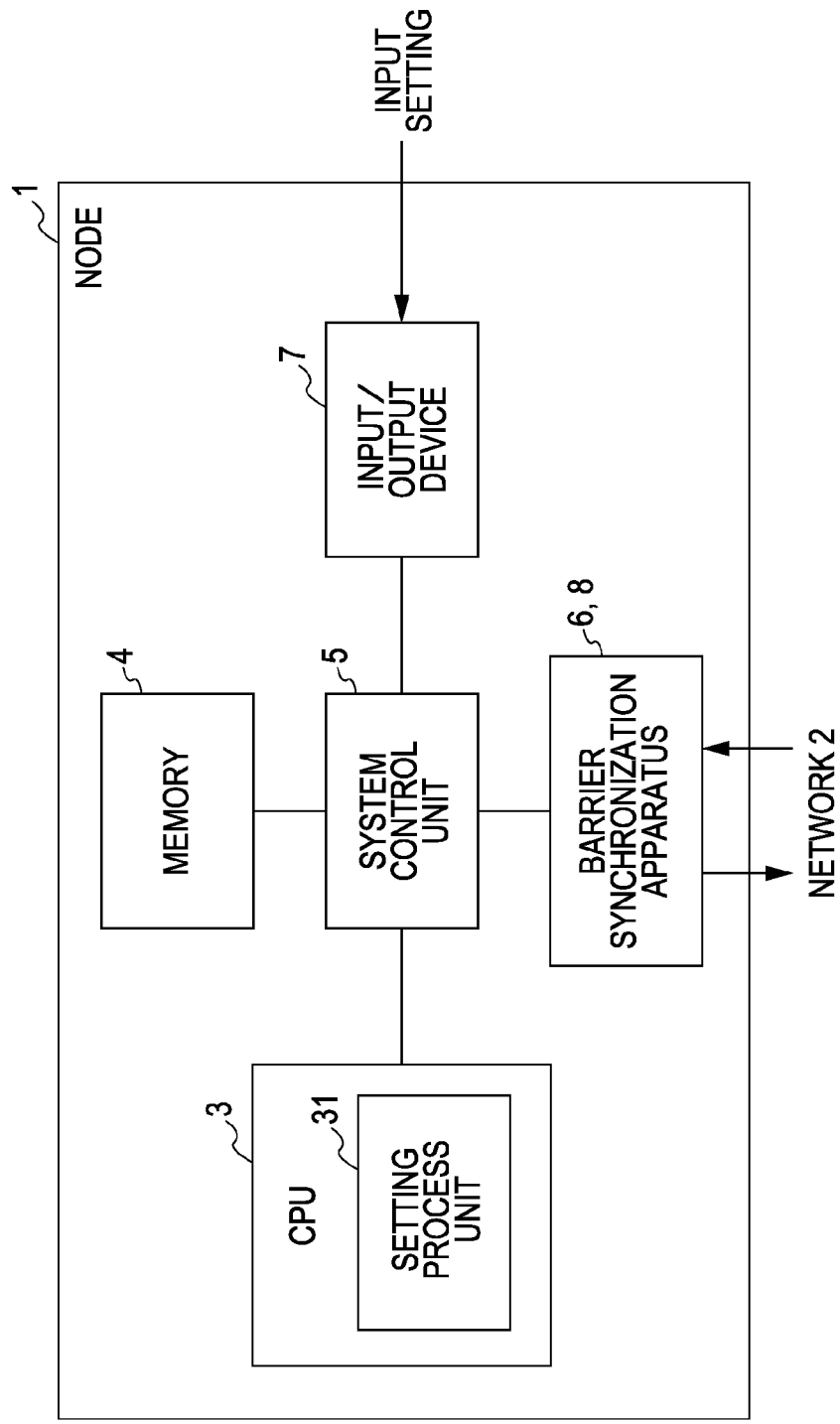
FIG. 2 is a diagram illustrating a configuration of a node according to an embodiment.

FIG. 1 illustrates a configuration of a computer network with a plurality of nodes. Each of the plurality of nodes includes a barrier synchronization apparatus according to an embodiment of the present invention. FIG. 2 illustrates a configuration of the nodes. Each of the nodes includes the barrier synchronization apparatus according to the embodiment. It is assumed that the barrier synchronization apparatus according to the embodiment performs barrier synchronization by using a butterfly.

The computer network according to the embodiment includes a plurality of nodes, e.g. computers 1, and a network 2 which connects the nodes to each other. In the example in FIG. 1, four nodes #1 to #4 are arranged on the computer network. The plurality of nodes 1 connected to each other by the network 2 execute a parallel arithmetic operation. Each of the plurality of nodes 1 includes a barrier synchronization apparatus 6 to perform barrier synchronization in a parallel arithmetic operation. The barrier synchronization apparatus 6 performs barrier synchronization.

The node 1 includes a CPU 3, a memory 4, a system controller 5, a barrier synchronization apparatus 6 and an input/output device 7. The system controller 5 controls the operation of the node 1, in other words, the CPU 3, the memory 4, the barrier synchronization apparatus 6 and the input/output device 7. The CPU 3 includes a setting processor 31.

The setting processor 31 exchanges data with the input/output device 7 through the system controller 5. In this manner, the input/output device 7 inputs setting conditions including an algorithm of the barrier synchronization and an execution condition to the setting processor 31 of the CPU 3. The input/output device 7 outputs data outputted from the setting processor 31 as needed.

The setting processor 31 transmits a signal indicating that a process arrives at a barrier point to the barrier synchronization apparatus 6 through the system controller 5. The setting processor 31 receives a signal indicating that barrier synchronization is established from the barrier synchronization apparatus 6 through the system controller 5. In this manner, the setting processor 31 sets the barrier synchronization apparatus 6 as a destination of a first synchronization signal and a destination of a second synchronization signal in the barrier synchronization apparatus 6 according to the setting conditions inputted from the input/output device 7. The barrier synchronization apparatus 6 communicates with the barrier synchronization apparatus of another node through the network 2 according to the setting conditions set by the setting processor 31 to perform barrier synchronization.

The setting processor 31 exchanges data with the memory 4 through the system controller 5. In this manner, the setting processor 31 writes data in the memory 4, and reads data from the memory 4. The data is used in, for example, a reduction operation which will be described later.

Figure 3:
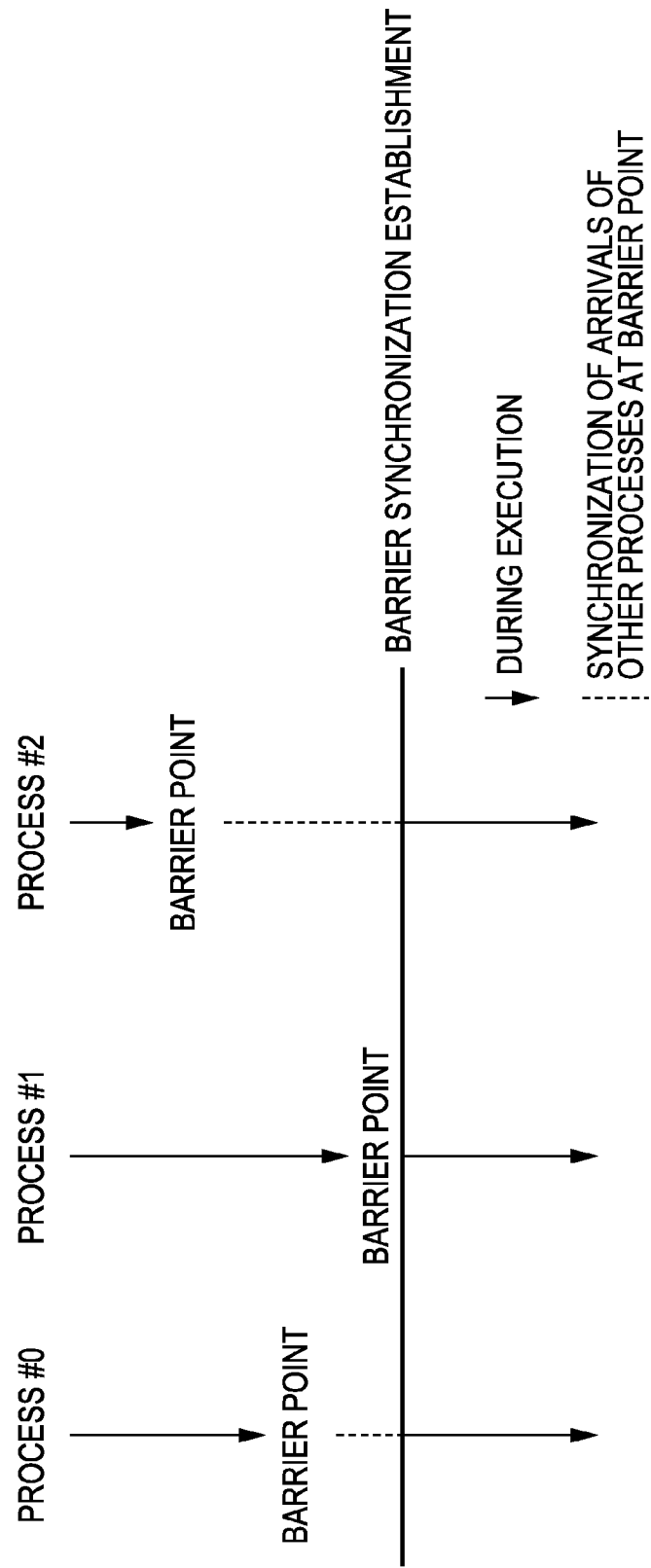
FIG. 3 is a diagram illustrating barrier synchronization according to an embodiment.

The barrier synchronization will be described below. As illustrated in FIG. 3, a plurality of processes #0 to #2 which perform barrier synchronization stops execution of the processes themselves when the execution of the processes arrives at a point at which the processes are synchronized, i.e., a barrier point. More specifically, when the plurality of processes #0 to #2 themselves arrive at the barrier point, the processes #0 to #2 wait until all the other processes arrive at the barrier point. The plurality of processes #0 to #2 restart the stopped execution when all the processes #0 to #2 subjected to the barrier synchronization arrive at the barrier point, i.e., when the barrier synchronization is established. In this manner, synchronization between the plurality of processes which are executed in parallel can be made.

One of algorithms which realize the barrier synchronization is a butterfly arithmetic operation. The butterfly arithmetic operation will be simply called a "butterfly" hereinafter. An operation is divided into a plurality of stages by the butterfly, and each stage performs signal communication with other processes. In the embodiment, the butterfly is used as an algorithm of the barrier synchronization.

Figure 4:
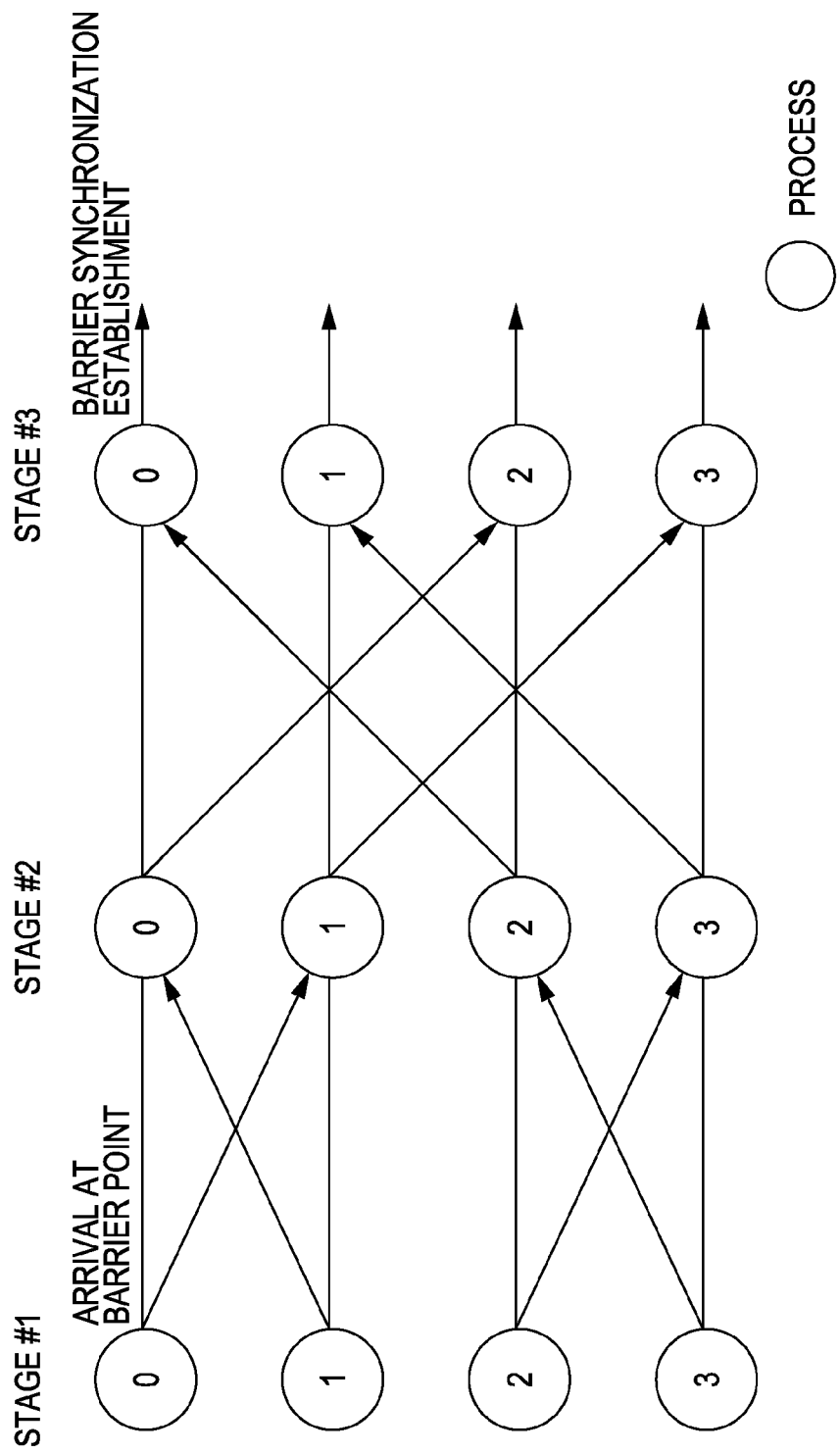
FIG. 4 is a diagram illustrating barrier synchronization according to an embodiment performed by a butterfly realized by four processes.

FIG. 4 illustrates an example in which barrier synchronization is performed by the butterfly between the four processes #0 to #3. In FIG. 4, for example, the process #0 is expressed by adding number 0 into a circle, and the other processes #1 to #3 are similarly expressed. In other drawings, processes are specified in the same manner as described above.

A destination of a signal indicating that a process arrives at a barrier point on each stage is given by i XOR $2^{(k-1)}$ when a stage number is represented by k and a process number of its own process or its own node 1 is represented by i. The number of stages is given by log(N) when the process number N is a power of 2.

For example, focusing on the process #0 in FIG. 4, a destination is determined as described below. On the stage #1, a destination of a signal outputted from the process #0 and indicating that the process arrives at a barrier point is the process #1. On the other hand, on the stage #2, the process #1 receives a signal outputted from the process #0 and indicating that the process arrives at the barrier point, and a destination of a signal outputted from the process #0 and indicating that the process arrives at the barrier point is the process #2.

The destinations of the signals can be uniquely determined such that an algorithm of barrier synchronization and execution conditions, e.g., a configuration of processes, are determined by setting conditions. In the embodiment, the algorithm of barrier synchronization is a butterfly, and the execution conditions are four processes, that means four processes are executed in parallel. For this reason, the destinations of the signals can be determined as illustrated in FIG. 4.

The setting conditions are inputted from the input/output device 7 to the setting processor 31. In the setting conditions of the embodiment, a butterfly is used as an algorithm of barrier synchronization, and execution conditions are set to be four processes. In addition, as execution conditions, the number k of stages of processes subjected to the barrier synchronization and a process number i of each process, e.g., its own node 1, are also inputted. The number k of stages indicates the maximum value of stage numbers.

The input of the setting conditions to the setting processor 31 is not limited to the input described above. For example, any one of the nodes 1 may input the setting conditions to the other nodes 1 through the network 2. A management computer connected to the network 2 may input the setting conditions to all the nodes 1 through the network 2.

The processes communicate a signal indicating that the process arrives at a barrier point with another process on each stage. For example, on the first stage #1, each of the processes arrives at a barrier synchronization point at any one of timings. Timings at which the processes arrive at the barrier synchronization point change depending on the processes. The processes arriving at the barrier synchronization point transmit signals to processes set in advance on the next stage on the butterfly network. In the embodiment, the butterfly network indicates the network 2 illustrated in FIG. 1, and is a network which performs barrier synchronization by the butterfly and to which the nodes 1 illustrated in FIG. 2 are connected. This is the same as in the following drawings.

On the next stage #2, the processes are synchronized by a signal from the process set in advance on the previous stage #1 of the butterfly network. When the processes receive signals from another process, the processes transmit signals to processes set in advance on the next stage #3.

On the final stage #3, the processes are synchronized by a signal from the process on the previous stage #2. When the processes receive signals from another process, the system would know that barrier synchronization is established after all the processes #0 to #3 arrive at a barrier point. Thereafter, the processes start the next operation because the barrier synchronization is established.

As described above, a method of causing processes to transmit a signal indicating that the processes arrive at a barrier point to a specific process is known, as another method which performs barrier synchronization. In this method, after the specific process receives the signals indicating that the processes arrive at a barrier point from all the processes, establishment of barrier synchronization is broadcasted from the specific process to all the processes. On the other hand, according to a barrier synchronization scheme realized by the butterfly network, the broadcasting is not necessary.

Figure 5:
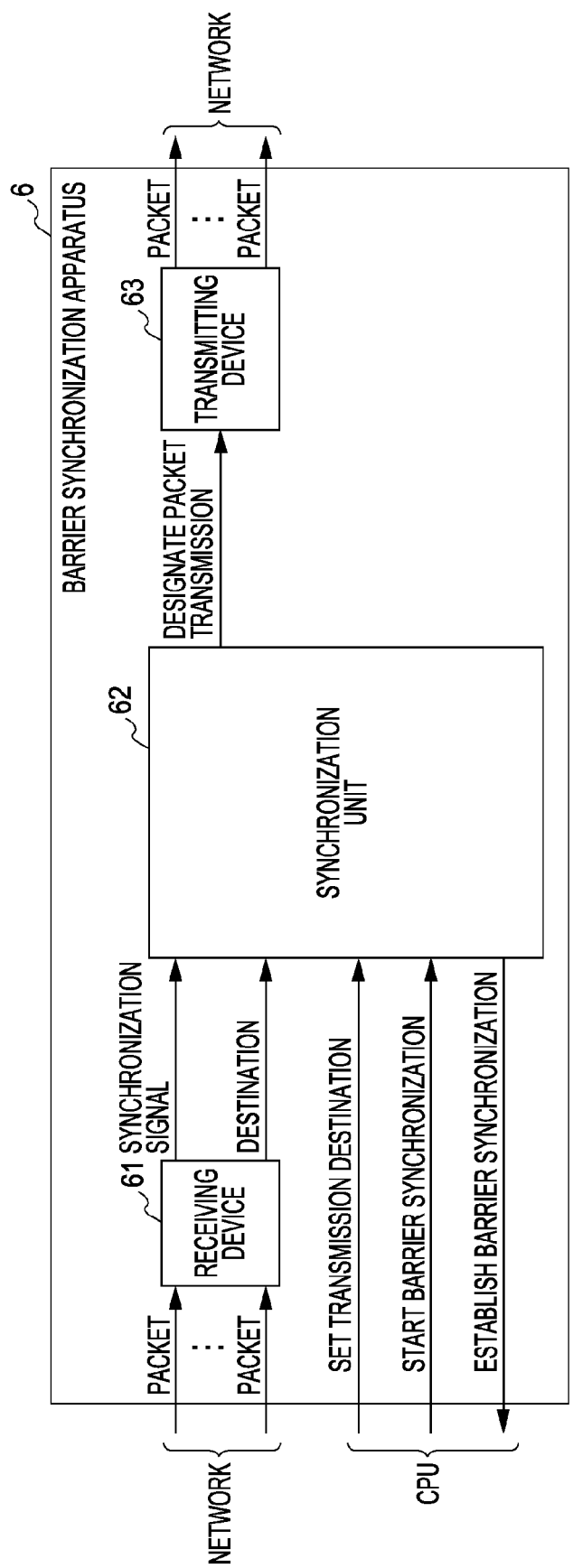
FIG. 5 is a diagram illustrating a configuration of a barrier synchronization apparatus according to an embodiment.
Figure 6:
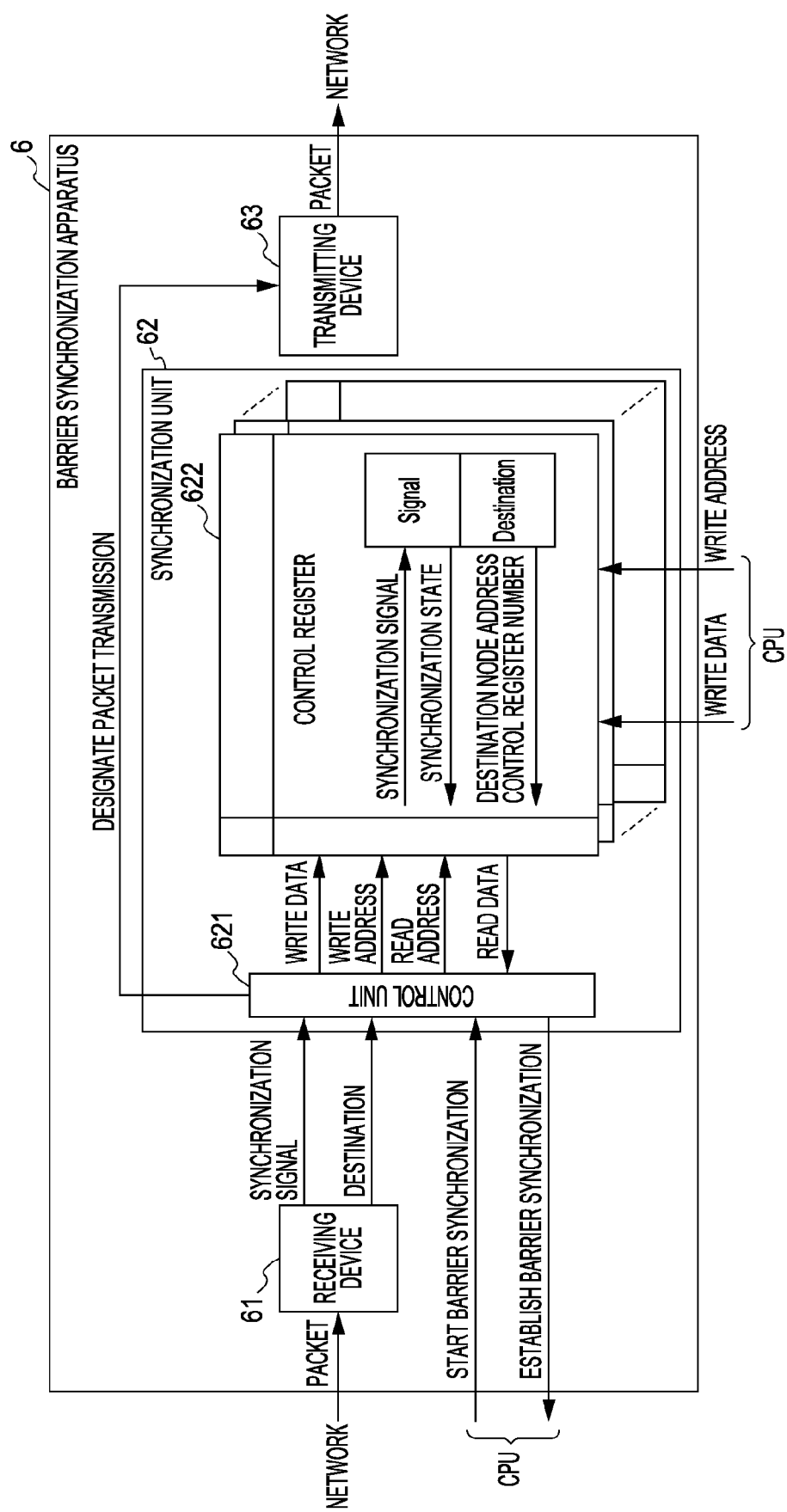
FIG. 6 is a diagram illustrating a configuration of a synchronization apparatus according to an embodiment.

FIG. 5 illustrates a configuration of a barrier synchronization device according to an embodiment. FIG. 6 is a configuration of a synchronization device included in the barrier synchronization apparatus in FIG. 5. In FIG. 6, a receiving device 61 and a transmitting device 63 are repetitively illustrated.

The barrier synchronization apparatus 6 includes the receiving device 61, a synchronization device (referred to as a "synchronization unit" hereinafter) 62, and the transmitting device 63. As illustrated in FIG. 6, the synchronization unit 62 includes a controller 621 and a plurality of control registers 622. Each of the plurality of control registers 622 is a register group including a plurality of registers.

The plurality of control registers 622 correspond to the pairs of synchronization signals, respectively. In other words, the barrier synchronization apparatus 6 includes the plurality of control registers 622 to hold synchronization signals in the control register every arithmetic operation and to make it possible to execute barrier synchronization. Therefore, when one pair of arithmetic operations is configured by n first synchronization signals, the synchronization device 62 executes barrier synchronization to each of the plurality of pairs each constituted by the n first synchronization signals. In this case, a plurality of processes are operated on one node.

In the first embodiment, a plurality of processes is operated on one node, and one pair of arithmetic operations is executed, so that barrier synchronization can be executed for the pair of arithmetic operations. In the first embodiment, in place of an operation in which the plurality of processes operates on one node, one process can be operated on one node 1. In this case, the process may be regarded as the node 1.

In the first embodiment, the control register 622 includes a signal register and a destination register. In FIG. 6, the signal register is expressed as a part with a reference symbol Signal, and the destination register is expressed as a part with a reference symbol Destination. This designation is used in the other drawings.

The controller 621 transmits a synchronization signal for barrier synchronization based on a reference result with reference to a plurality of control registers 622. The signal register stores information indicating whether a synchronization signal is received from a process or a node corresponding to the control register 622. In this manner, the signal register stores information indicating a synchronization state of a synchronization signal. The destination register stores information indicating a process or a node serving as a destination to which the control register 622 should transmit a synchronization signal. In this manner, the destination register stores information indicating a transmission destination of the synchronization signal after the synchronization is established.

When the transmission destination of the synchronization signal is another node, the destination register stores a destination node address serving as a transmission destination and a control register number. The destination node address is a network address of a node, and is uniquely determined. The destination node address may be a node number added to a node in advance. The control register number is a number of the control register 622, and is uniquely determined in a node. The control register number may be a number or a pair number added to the control register 622 in advance.

The destination node address and the control register number are designated to determine one control register in one node. When the transmission destination of the synchronization signal is a node which transmits the synchronization signal, a control register number of the synchronization unit 62 of the process itself or the node itself is stored in the destination register.

Prior to execution of barrier synchronization, the setting processor 31 of the CPU 3 sets parameters required for the control register 622 through the controller 621 based on the setting conditions. The parameters set to the control register 622, for example, include a destination node address of the next stage of the control register 622 and a control register number of the control register. As described above, the setting conditions include an algorithm and execution conditions of the barrier synchronization.

After the parameters are set, the setting processor 31 transmits a barrier synchronization start signal to the controller 621 to start barrier synchronization. When synchronization is established on the final stage of the process, the synchronization device 62 transmits a signal representing establishment of barrier synchronization, i.e., completion of barrier synchronization to the setting processor 31.

The receiving device 61 is connected to another node through the network 2 and receives a packet from another node including a synchronization signal. When the receiving device 61 receives a first synchronization signal the transmission destination of which is set in advance from another node according to the setting conditions including the algorithm and the execution conditions of the barrier synchronization, the receiving device 61 transmits the received first synchronization signal to the synchronization device 62. For this reason, the receiving device 61 receives a packet for barrier synchronization from a barrier synchronization apparatus of the other node through the network 2. When the receiving device 61 receives a packet from another node, the receiving device 61 generates a synchronization signal and a destination information indicating a destination based on the received packet, to transmit the synchronization signal and the destination information to the synchronization unit 62. More specifically, the receiving device 61 extracts information of the synchronization signal and the destination information included in the received packet to transmit the extracted information to the synchronization unit 62. The destination information includes a destination node address serving as a destination of the synchronization signal and a control register number of the control register. According to the destination, the control register 622 corresponding to a node corresponding to the extracted destination node address and the extracted control register number can be determined.

When a transmission source includes a plurality of nodes, if the receiving device 61 includes network interfaces the number of which corresponds to the number of nodes serving as transmission sources, packets transmitted from the plurality of nodes can be simultaneously received by using the plurality of receiving devices 61. This operation is also performed in the transmitting device 63.

The synchronization unit 62 performs a barrier synchronization process based on the synchronization signal and the destination information from the receiving device 61. The synchronization unit 62 performs synchronization of a plurality of pairs of synchronization signals. After the synchronization of each of the pairs of synchronization signals is established, the synchronization signals are transmitted to a transmission destination designated by the destination information. In this manner, in the algorithm which performs barrier synchronization, an operation which changes transmission destinations of signals indicating that the processes arrive at a barrier point can be performed at a high speed on each stage. A control register number which is uniquely determined is allocated to each of the pairs of synchronization signals. The synchronization unit 62 receives both the synchronization signal and the control register number from the receiving device 61, and outputs the pairs of synchronization signals which are synchronized with each other to the transmitting device 63.

For example, with respect to the pairs of synchronization signals, the synchronization unit 62 synchronizes n (n is a positive integer) first synchronization signals which are set in advance according to the setting conditions. When the n synchronization signals are inputted for each pair of synchronization signals, the synchronization is established. The synchronization unit 62 designates the transmitting device 63 to transmit a second synchronization signal after the synchronization is established. The number of second synchronization signals is set to m (m is a positive integer), and a transmission destination of the second synchronization signals is set in advance according to the setting conditions.

When the synchronization is established, the synchronization unit 62 transmits the pairs of synchronization signals to the transmission destination set in advance. The transmission destination is a synchronization unit of another node or the synchronization unit 62 of its own node. When the transmission destination of the synchronization signal is another node, a destination node address of the transmission destination node and a control address number is set to the synchronization unit 62 in advance. In this case, the synchronization unit 62 transmits a signal which designates transmission of a packet to the transmitting device 63. The transmitting device 63 which receives the packet transmission designation from the synchronization unit 62 transmits a packet for barrier synchronization to a barrier synchronization device of another node designated by a destination node address through the network 2. On the other hand, when the transmission destination of the synchronization signal is its own node, a control register number or a control register number is set in the synchronization unit 62 in advance. The synchronization unit 62 transmits a synchronization signal to the designated control register 622 of the synchronization unit 62 of its own process or its own node.

When the synchronization unit 62 receives a signal for the start of barrier synchronization from the setting processor 31 of the CPU 3, the synchronization unit 62 transmits a synchronization signal to a designated transmission destination. When synchronization of the final pair of synchronization signals is established, the synchronization unit 62 notifies the setting processor 31 in the CPU 3 of a signal representing completion of barrier synchronization.

When the transmitting device 63 receives a designation of transmission from the synchronization unit 62, the transmitting device 63 transmits a second synchronization signal to m transmission destinations set in advance. The transmission device 63 receives a signal for designation of packet transmission from the synchronization unit 62, generates a packet based on the designated transmission destination, and transmits the packet to another node through the network 2. As described above, a node serving as the transmission destination is determined based on a transmission destination node address and the control register number.

Figure 7:
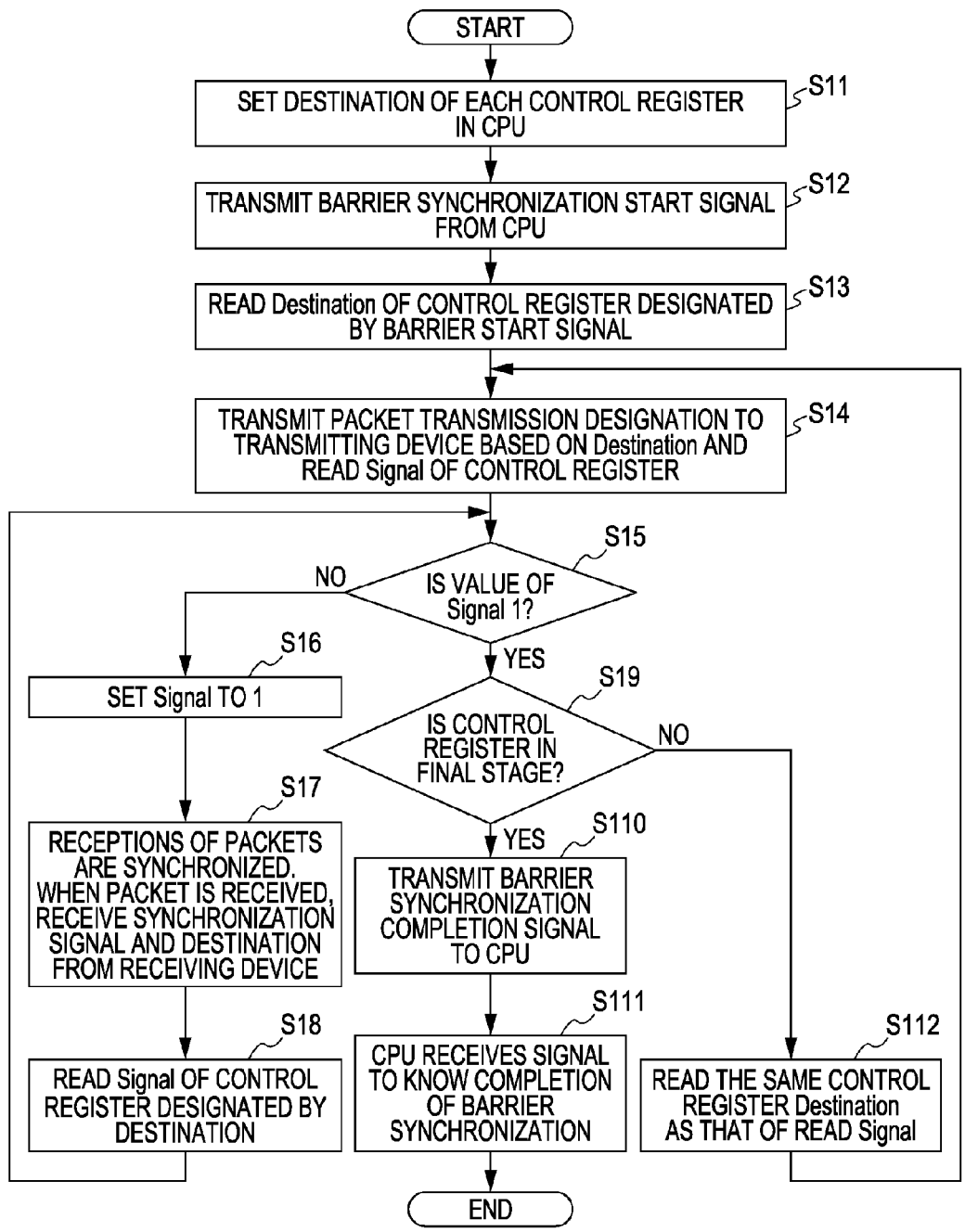
FIG. 7 is a process flow chart of execution of barrier synchronization according to an embodiment.

FIG. 7 illustrates a process flow of a barrier synchronization process executed by the barrier synchronization apparatus in FIG. 5 and realized by a butterfly.

The setting processor 31 set in the CPU determines a role of the control register 622 based on the algorithm of barrier synchronization and the setting conditions before barrier synchronization is started. And the setting processor 31 sets a destination node address and a control register number corresponding to the next stage in the butterfly to the destination register of each of the control registers 622 (S11).

The setting processor 31 inputs a control register number of the control register 622 the destination node address and the control register number of which should be set to the synchronization unit 62 as a write address. The setting processor 31 inputs the destination node address and the control register number to be set to the destination register of the control register 622 as write data to a controller 621 of the synchronization unit 62. The write address and the write data are inputted for each of the control register 622. Accordingly, the controller 621 stores the destination node address and the control register number which are the inputted write data in the destination register of the control register 622 designated by the write address. Storage of the write data is actually executed by the controller 621 which receive the write address and the write data from the setting processor 31. On the other hand, aside from this, an initial value of the signal register is set as, for example, "0" in advance, For example, the destination node address and the control register number are set as described below. When the number of nodes is a power of 2, after synchronization is established in a butterfly, to two positions, e.g., the next stage of its own process or its own node and the next stage in another node, synchronization signals are transmitted. Therefore, a destination designated as a destination register is a control register number of its own process or its own node or any one of the destination node address of the other node and the control register number.

On the first stage, since signals are not synchronized with each other, a signal register is not used. On the other hand, on the final stage, a destination register is not used. Therefore, since the same register is not used on the first stage and the final stage, the same control register 622 is designated on the first and final stages. For example, in FIG. 8, on the first stage and the final stage, the same control register number #1 is designated.

Even though the same register is not used in the first stage and the final stage, different control registers 622 may be designated on the first and final stages. For example, the number of the control registers 622 is sufficiently large, on the final stage in FIG. 8, a control register number #3 may be designated.

Figure 8:
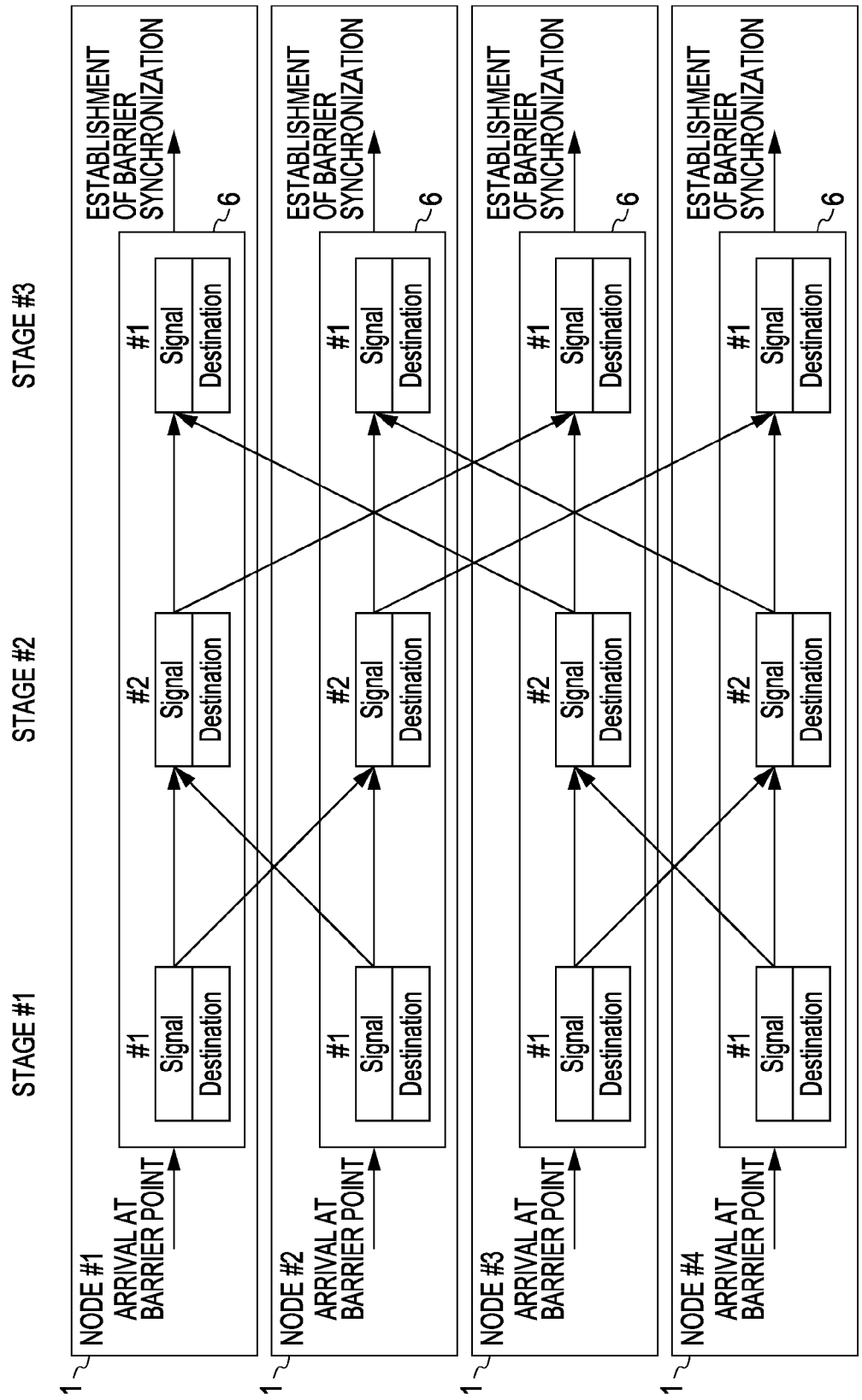
FIG. 8 is a diagram illustrating flows of signals in barrier synchronization performed by a butterfly.

In FIG. 8, reference symbols such as #1 added to pairs of signal registers and destination registers denote control register numbers. This is satisfied in FIGS. 14, 17, and 20. In this following explanation, the control register 622 of the control register number #1 is also called a control register #1.

When the number of nodes is not a power of 2, in order to make the number of nodes to a power of 2, the control register 622 included in an additional node added to the network 2 is given to another node. For example, in FIG. 8, in order to make barrier synchronization between the nodes #1 to #3, the control register 622 included in the node is given to any one of the nodes #1 to #3. In this case, since only a control register corresponding to a repeating stage is necessary, the control register #2 corresponding to the repeating stage is given to any one of the nodes #1 to #3. Furthermore, on the first stage, the value of a signal register of a transmission destination of the control register is set to "1" in advance. On the final stage, the control register on the first stage is eliminated from the destination register of the transmission source of the control register.

When a process arrives at a barrier point, the setting processor 31 transmits a signal representing the start of barrier synchronization to the synchronization unit 62 of the barrier synchronization apparatus 6 (S12). A barrier synchronization start signal includes a number of the control registers 622 corresponding to the first stage. For example, in the node #1 in FIG. 8, the barrier synchronization start signal designates the control register #1. On the first stage, since a packet is not received from another process, a synchronization signal and a destination are not transmitted from the receiving device 61 to the controller 621.

When the controller 621 of the synchronization unit 62 receives the signal for the start of barrier synchronization, the controller 621 reads a value of a destination register of the control register 622 corresponding to a number designated by the barrier synchronization start signal (S13). The value of the destination register is called a "Destination" hereinafter. In order to read the destination register, the controller 621 uses the control register number designated by the barrier synchronization start signal as a read address to read the value of the destination register of the control register 622 of the address as read data. A signal register of the control register 622 corresponding to the first stage is not used. Therefore, synchronization for synchronization signals is not performed. For example, in the node #1 in FIG. 8, a value of a destination register of the control register #1 is a control register 32 of the node #2 serving as another node and the control register #2 of the node #1 serving as its own node.

The controller 621 transmits a signal for packet transmission designation to the transmitting device 63 based on a value which designates the control register 622 of another node in values of destination registers (S14). The packet transmission designation includes a value of a destination register which designates anther node. The transmitting device 63 generates a packet based on a destination node address designated by the packet transmission designation from the controller 621 and a control register number and transmits the packet to the network 2. The transmission destination of the packet includes the designated destination node address and the control register number. In this manner, the packet, in the example in FIG. 8, is transmitted from the node #1 to the node #2 by using the control register #2 of the node #2 as a destination. This packet includes, for example, a synchronization signal.

The transmitting device 63 reads the value of the signal register of the control register 622 designated in the destination register based on the value which designates the control register 622 of its own node in the values of the destination register (S14). More specifically, the transmitting device 63 reads the value of the signal register of the control register 622 on the next stage of its own node. This is performed to transmit a synchronization signal to the synchronization unit 62 of its own node and to make synchronization in its own node. The value of the signal register is also called a "signal" hereinafter.

Subsequently, the synchronization unit 62 examines whether "1" indicating a synchronization state is set in the signal register on the next state (S15). When "1" is set in the signal register (Yes in S15), synchronization is established. On the other hand, when "1" is not set in the signal register (No in S15), synchronization is not established.

When the synchronization is not established (No in S15), the synchronization unit 62 sets the value Signal of the signal register of the control register 622 on the next state to "1". Thereafter, receptions of packets are synchronized with each other (S16). In order to set the control register 622, the controller 621 uses a value which designates its own node in the read values of the destination register as a write address, and "1" is written in the signal register of the control register 622 of the address as write data. For example, in the node #2 in FIG. 8, the value of the signal register of the control register #1 is set to "1". In this manner, it is signified that one of synchronization signals to be synchronized with each other is received.

Thereafter, when the receiving device 61 receives a packet, the receiving device 61 extracts a synchronization signal and a control register number serving as a designation based on the received packet and transmits the synchronization signal and the control register number to the synchronization unit 62 (S17).

When the controller 621 of the synchronization unit 62 receives the signal from the receiving device 61, the controller 621 reads the value of the signal register of the designated control register 622 (S18). Thereafter, operations subsequent to S15 are repeated. For example, when the controller 621 receives the synchronization signal and the destination from the receiving device 61, the controller 621 reads the value of the signal register of the control register 622 based on the received control register number. In order to read the signal register, the controller 621 uses the designated control register number as a read address to read the value of the signal register of the control register 622 of the address as read data.

On the other hand, when the synchronization is established in S15 (Yes in S15), the controller 621 further examines whether the control register 622 corresponds to the final stage (S19). For example, in the node #1 in FIG. 8, after execution of step S16, the value of the signal register of the control register #2 is "1". Therefore, in this case, synchronization is established.

When the synchronization is established in the control register 622 corresponding to the final stage (Yes in S19), the controller 621 transmits a signal representing the establishment of barrier synchronization to the setting processor 31 of the CPU (S110).

The setting processor 31 receives the signal indicating the establishment of barrier synchronization from the controller 621 to know the establishment of barrier synchronization (S111).

When the control register 622 does not correspond to the final stage in S19 (No in S19), the controller 621 reads a value of the destination register of the control register 622 in which synchronization is established (S112), the operations subsequent to S14 are repeated. For example, in the node #1 in FIG. 8, since the control register #2 does not correspond to the final stage, the operations subsequent to S14 are repeated.

FIG. 8 illustrates a flow of a synchronization signal between stages in a barrier synchronization process realized by a butterfly in FIG. 7. In FIG. 8, reference symbols #1 or the like in the synchronization apparatus 6 denote register numbers of the plurality of control registers 622. FIG. 8 illustrates a state in which synchronization signals are sequentially transmitted with time from the left. This point is the same as those in other drawings.

In FIG. 8, with reference to the node #1, a synchronization signal flows as described below. For example, when the node #1 arrives at a barrier point, the node #1 is designated to start synchronization by inputting a barrier synchronization start signal. According to this, on the stage #1, the node #1 transmits synchronization signals to the node #1 and node #2 which are destinations which are designated in advance.

On the stage #2, the node #1 which receives its own synchronization signal synchronizes the synchronization signal with a synchronization signal from the node #2 designated in advance. After the node #2 arrives at a barrier point, the synchronization signal of the stage #2 from the node #2 similarly arrives at the node #1. When the synchronization signal from the node #2 arrives at, in the node #1, its own synchronization signal and the synchronization signal from the node #2 are synchronized with each other, i.e., synchronization between the two signals is established. When the synchronization is established, the node #1, on the stage #2, transmits synchronization signals to the node #1 and the node #3 which are destinations designated in advance.

On the stage #3, the node #1 which receives its own synchronization signal synchronizes the synchronization signal with a synchronization signal from the node #3 which is designated in advance. After the node #3 arrives at a barrier point and after a synchronization signal from the node #4 which arrives at the barrier point is received, similarly, the synchronization signal of the stage #3 arrives at from the node #3 to the node #1. When the synchronization signal from the node #3 arrives at, in the node #1, its own synchronization signal and the synchronization signal from the node #3 is established. When the synchronization is established, the node #1 determines that barrier synchronization is established on the stage #3 to output a barrier synchronization establishment signal.

In the nodes #2 to #4, similarly, barrier synchronization is established on the stage #3, and a barrier synchronization establishment signal is output. In this manner, barrier synchronization realized by a butterfly is executed.

Therefore, the flow of the synchronization signal in FIG. 8 is the same flow as in FIG. 4, and it is understood that barrier synchronization realized by a butterfly is executed.

Figure 9:
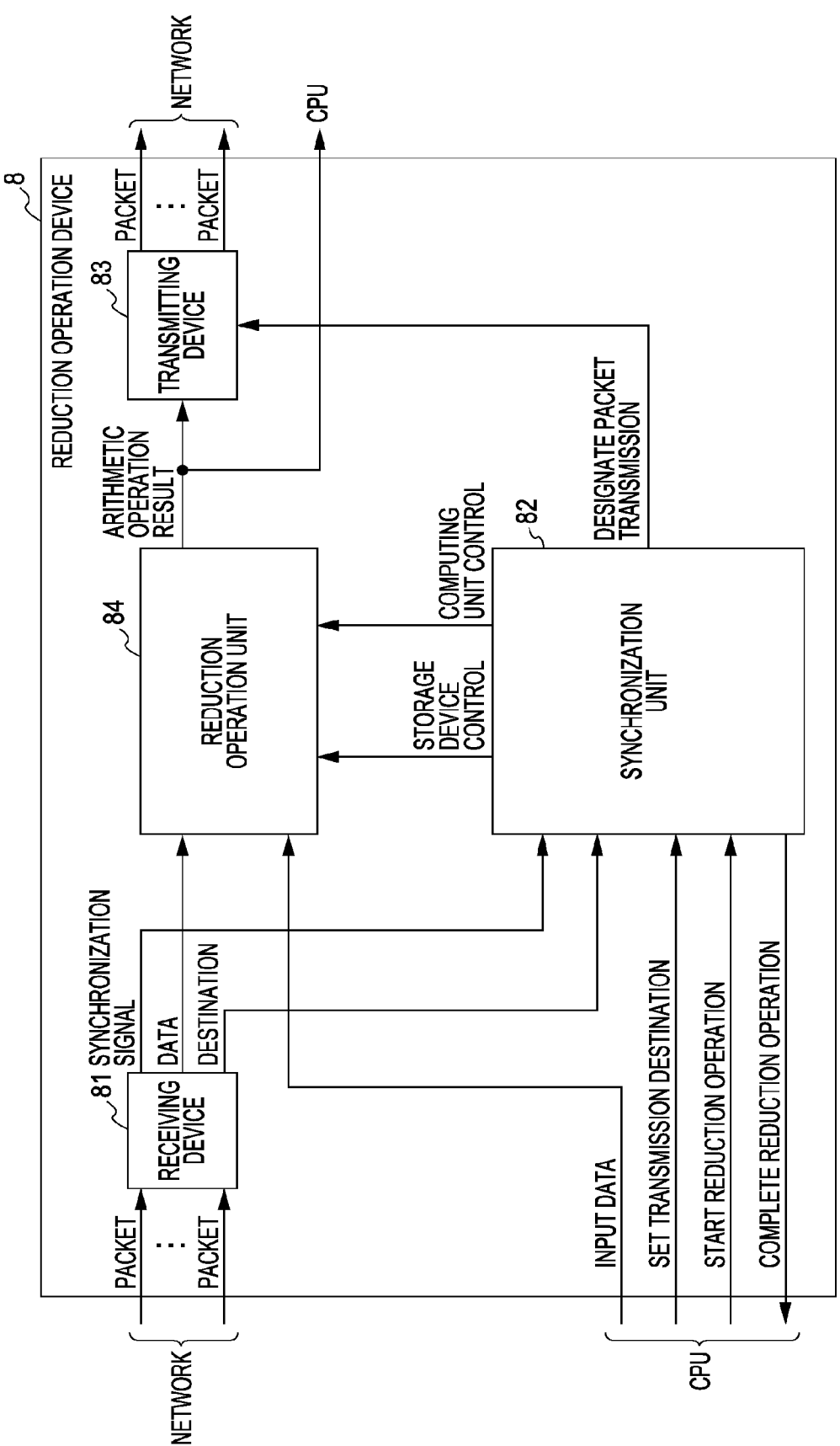
FIG. 9 is a diagram illustrating a configuration of a reduction operation device according to an embodiment.
Figure 10:
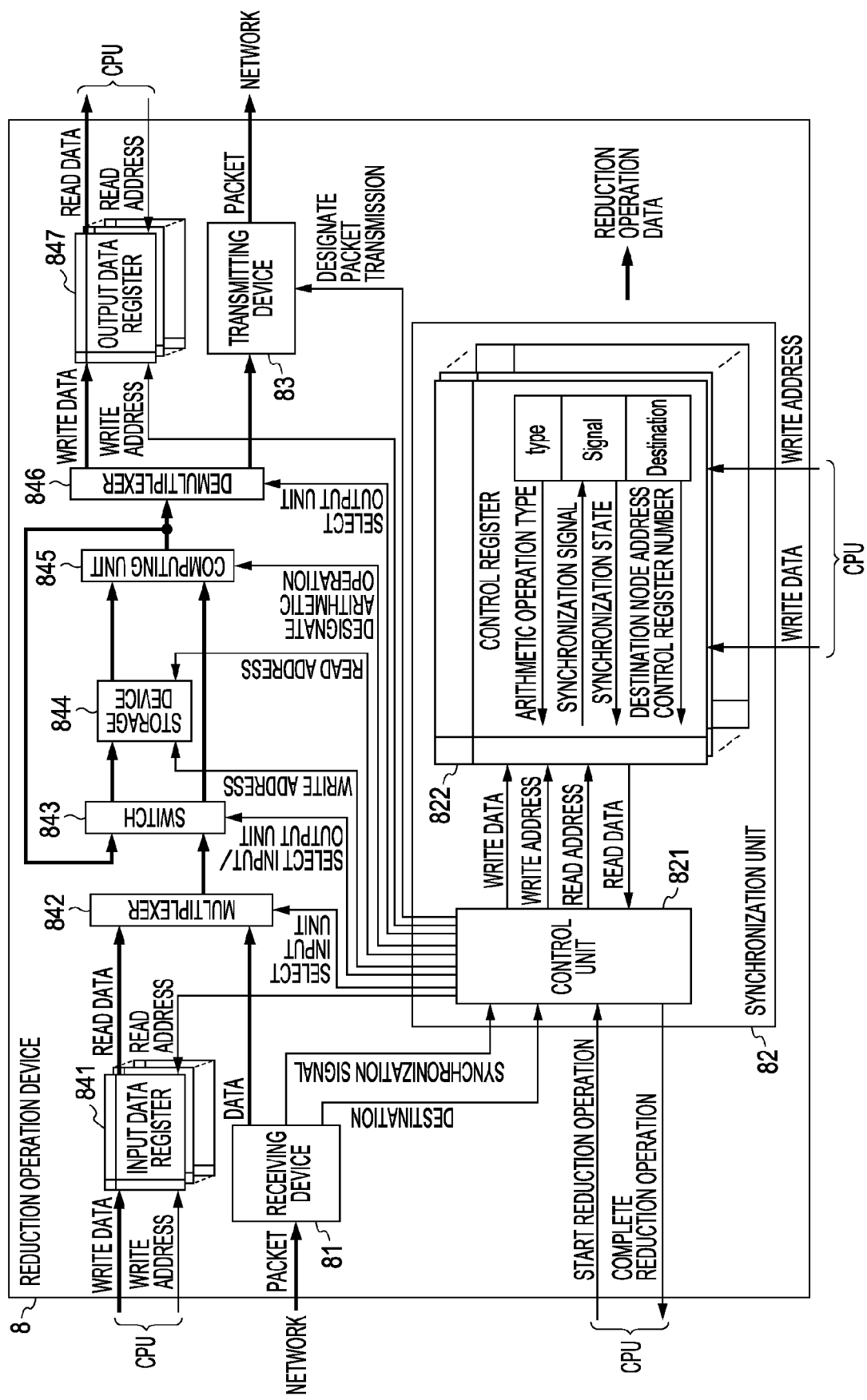
FIG. 10 is a diagram illustrating a configuration of a reduction operation unit according to an embodiment.
Figure 11:
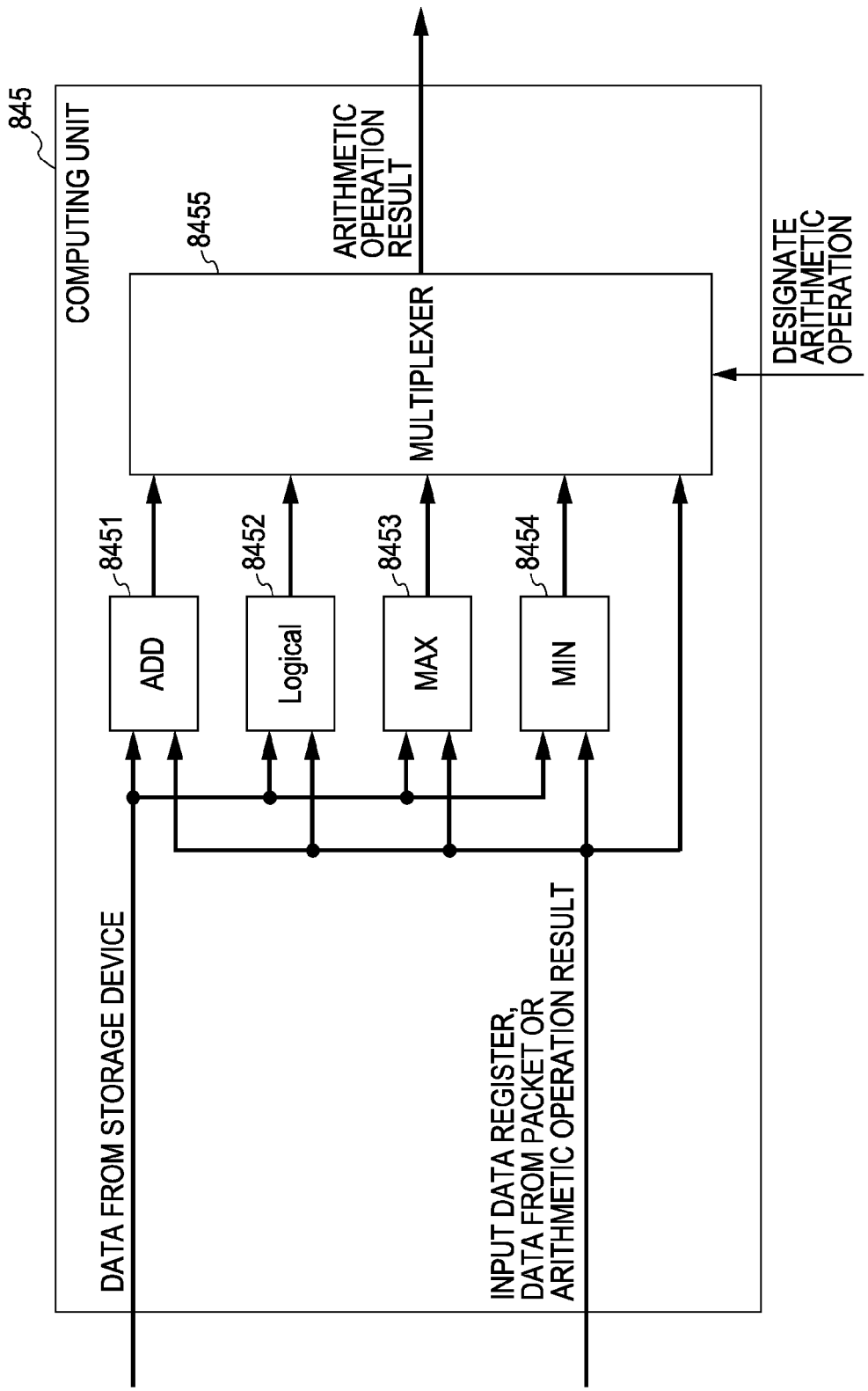
FIG. 11 is a diagram illustrating a configuration of a computing unit according to an embodiment.

FIG. 9 illustrates an example of a configuration of a reduction operation device according to a second embodiment. FIG. 10 illustrates an example of a configuration of a synchronization unit 82 and a reduction operation unit which are included in the reduction operation device in FIG. 9. FIG. 11 illustrates an example of a configuration of a computer 845 included in the reduction operation unit in FIG. 10. The second embodiment relates to a reduction operation device which performs a reduction operation while performing barrier synchronization by a butterfly.

In the second embodiment, a reduction operation device 8 is set in the node 1 which configures a computer network illustrated in FIG. 1. In the second embodiment, the node 1 includes a configuration in which the barrier synchronization apparatus 6 of the node 1 illustrated in FIG. 2 is replaced with the reduction operation device 8. More specifically, the node 1 in the second embodiment has the same configuration as that of the node 1 illustrated in FIG. 2 except for the barrier synchronization apparatus 6. Some of the same or the similar elements as those in the node 1 illustrated in FIG. 2 are not illustrated.

The reduction operation device 8 performs a reduction operation while making barrier synchronization. The reduction operation device includes a reduction operation unit 84 and a synchronization device (referred to as "synchronization unit" hereinafter) 82. The synchronization unit 82 includes a controller 821 and a control register 822. The reduction operation unit 84 includes an input data register 841, a multiplexer 842, a switch 843, a storage device 844, the computer 845, a demultiplexer 846, and an output data register 847.

The reduction operation device 8 includes the same configuration as that of the barrier synchronization apparatus 6 except that the reduction operation device 8 includes the reduction operation unit 84. Since the reduction operation device 8 includes the reduction operation unit 84, a signal indicating the start of a reduction operation is inputted in place of a signal indicating the start of barrier synchronization, and a signal indicating the completion of a reduction operation is outputted in place of a signal indicating establishment of barrier synchronization.

Since the reduction operation device 8 includes the reduction operation unit 84, the reduction operation device 8 performs transmission and reception of a packet and transmission and reception of data with the network 2, and also performs transmission and reception of a control signal and data with the setting processor 31 of the CPU 3.

Since the reduction operation device 8 includes the reduction operation unit 84, the reduction operation device 8 receives target data subjected to a reduction operation from the outside and outputs a result of the reduction operation to the outside.

First target data subjected to a reduction operation is inputted from the setting processor 31 of the CPU 3 to the input data register 841 as write data, and inputted from the input data register 841 to the multiplexer 842 as read data. Second target data subjected to a reduction operation is inputted as a packet from the network 2 through a receiving device 81, extracted from the packet, and inputted to the multiplexer 842.

On the other hand, a result of the reduction operation is outputted from the demultiplexer 846 to the output data register 847 as write data and outputted as read data from the output data register 847 to the setting processor 31. A result of the reduction operation is outputted from the demultiplexer 846 to a transmitting device 83 and transmitted from the transmitting device 83 to the network 2 as a pocket.

The number of input data registers 841 and the number of output data registers 847 are two or more each. The input data registers 841 correspond the control registers 822, respectively. The output data register 847 also correspond to the control registers 822, respectively.

The input data register 841 to which write data shall be written is designated by a write address from the setting processor 31. The input data register 841 from which read data is read is designated by a read address from the controller 821. The read address of the input data register 841 corresponds to the control register 822 designated by a destination in the packet received from, for example, the receiving device 81, and is generated based on a control register number of the control register 822. The output data register 847 in which write data should be written is designated by a write address from the controller 821. A write address of the output data register 847 corresponds to the control register 822 used in a reduction operation of the write data, and is generated based on a control register number of the control register 822. The output data register 847 from which read data should be read is designated by a read address from the setting processor 31.

In order to execute a reduction operation, the setting processor 31 sets, according to setting conditions inputted from the input/output device 7, a transmission destination of the first synchronization signal and a transmission destination of the second synchronization signal in the reduction operation device 8 as the reduction operation device 8.

The setting processor 31 transmits data to be arithmetically operated to the reduction operation device 8 at the start of reduction operation through the system controller 5, and receives a reduction operation result from the reduction operation device 8. The reduction operation device 8 communicates with a reduction operation device of another node through the network 2 (illustrated as a "Network"), and performs a reduction operation based on the communication.

Furthermore, in order to execute a reduction operation, the synchronization unit 82 included in the reduction operation device 8 designates the transmitting device 83 to transmit the second synchronization signal (illustrated as "packet transmission designation") after the establishment of synchronization, and designates the reduction operation unit 84 to perform a predetermined reduction operation. When the transmitting device 83 receives a designation of transmission of the second synchronization signal, the transmitting device 83 transmits a result of the reduction operation in the computer 845 to the setting processor 31 together with the second synchronization signal.

The synchronization unit 82 includes a type register in the control register 822. In FIG. 10, the type register is expressed as a part added with a symbol type. This point is the same as those in other drawings. The type register stores information representing a type of an arithmetic operation to control a reduction operation in the computer 845. Information stored in the type register is also inputted from the input/output device 7 as some of the setting conditions.

A reduction operation will be described below. The reduction operation, as described above, can be executed by using the same algorithm as that in barrier synchronization. More specifically, the reduction operation can be executed by a butterfly network which executes barrier synchronization realized by a butterfly.

Therefore, the reduction operation, as illustrated in FIGS. 3 and 4, the operation is divided into a plurality of stages, and each process communicates a signal with another process on each stage. When one process is operated on one node, the process may be regarded as the node. Execution and a transmission destination of a process on each stage are basically the same as those in barrier synchronization.

Figure 12:
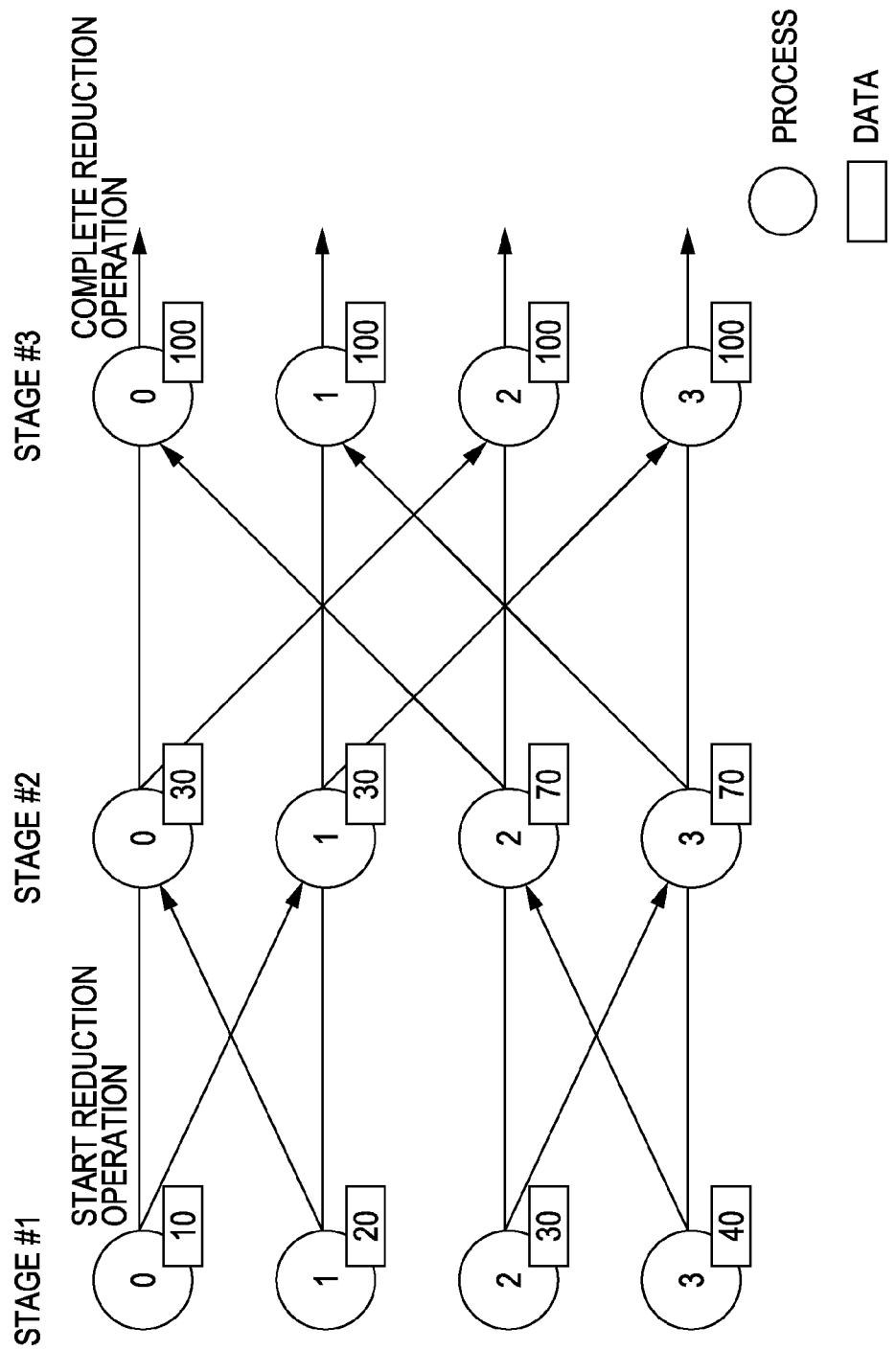
FIG. 12 is a diagram illustrating a reduction operation performed by a butterfly.

In the reduction operation, as illustrated in FIG. 12, each process on the first stage #1 transmits data to be arithmetically operated to a process of the next stage #2. On the stage #2, when each process receives data from the process of the previous stage #1, for example, the process adds its own data to the data from the process of the previous stage #1 and transmits an arithmetic operation result to a process of the next stage #3. When each process on the final stage #3 receives the data from the process of the previous stage #2, for example, the process adds the received data and its own arithmetic operation result on the stage #2. The addition result is a result of summation.

As another method of a reduction operation, a method of transmitting data to a specific process to perform an arithmetic operation can be considered. In this method, in order to cause all the processes to have arithmetic operation results, respectively, broadcasting from a specific process is used. According to a reduction operation realized by a butterfly network, broadcasting is not necessary.

A reduction operation in the second embodiment will be described below.

The setting processor 31, as in the barrier synchronization apparatus 6, sets a destination node address of a next stage, a control register number, and the like in the control register 822 corresponding to each pair of reduction operations in the synchronization unit 82 based on setting conditions. Thereafter, the setting processor 31 transmits inputted data and a reduction synchronization start signal to the reduction operation unit 84. In this manner, a reduction operation performed by the reduction operation unit 84 is started. When synchronization is established in the control register 822 corresponding to the final stage, the reduction operation device 8 transmits an arithmetic operation result and a signal representing the completion of a reduction operation to the setting processor 31.

The receiving device 81 receives a packet from the CPU 3 through the network 2, transmits a pair of a synchronization signal and a destination to the synchronization unit 82 based on the received packet, and transmits data received as the packet to the reduction operation unit 84.

In the reduction operation unit 84, the input data register 841 temporarily stores inputted data ("write data" illustrated in FIG. 10) transmitted from the CPU 3 and subjected to reduction operation, and inputs the stored data as "read data" to the storage device 844 through the multiplexer 842 according to a designation from the controller 821. Data from the CPU 3, as described above, is inputted at the start of a reduction operation.

The storage device 844 stores data inputted through the input data register 841. In this manner, the storage device 844 holds data used in a reduction operation. A storage capacity of the storage device 844 is given by, for example, (the number of control registers 822)×(the number of bits of data). An address of the storage device 844 in which the data used in the reduction operation shall be held is designated by a write address from the controller 821. A write address of the storage device 844 corresponds to the control register 822 used in the reduction operation, and is generated based on a control register number of the control register 822.

The data stored in the storage device 844 and used in the reduction operation is read and inputted to the computer 822 such that a read address is designated from the controller 821. The read address of the storage device 844 corresponds to the control register 822 used in the reduction operation, and is generated based on the control register number of the control register 822.

The multiplexer 842 selects data from the input data register 841 or data from the receiving device 81 according to a designation for input unit selection from the controller 821, and inputs the selected data to the storage device 844 or the computer 845 through the switch 843. When a synchronization signal and a destination information are inputted from the receiving device 81, the designation for selection of the input unit selection outputs data from the receiving device 81 to the multiplexer 842, otherwise, read data from the input data register 841 is outputted to the multiplexer 842.

According to a designation for input/output unit selection from the controller 821, the switch 843 inputs an input from the multiplexer 842 or the computer 845 to the storage device 844 or the computer 845. When data is inputted from the multiplexer 842, the designation for input/output unit selection inputs the data from the multiplexer 842, otherwise, the designation inputs the data from the computer 845. When synchronization is established, the designation for input/output unit selection outputs the inputted data to the computer 845, otherwise, the designation outputs the inputted data to the storage device 844.

When synchronization is established, the computer 845 performs a predetermined arithmetic operation to data synchronized in the storage device 844, data from a packet input through the multiplexer 842, or a previous arithmetic operation result. That is, when the computer 845 receives a designation from the controller 821 of the synchronization unit 82, the computer 845 performs a reduction operation by using data stored in the storage device 844. More specifically, the computer 845 executes a predetermined arithmetic operation according to an arithmetic operation designation from the controller 821, inputs a result of the arithmetic operation to the demultiplexer 846, and inputs the result to the switch 843.

The computer 845, as illustrated in FIG. 11, includes arithmetic units 8451 to 8454 and a multiplexer 8455. An adder (ADD) 8451, a logical sum operation unit (Logical) 8452, a maximum value calculating unit (MAX) 8453, and a minimum value calculating unit (MIN) 8454 constitute the arithmetic units. The arithmetic units 8451 to 8454 execute predetermined arithmetic operations, respectively.

The computer 845 performs arithmetic operations of designated types between data inputted from the storage device 844, e.g., first data, data inputted from the input data register 841, and data from a packet received by the receiving device 81 or an arithmetic operation result obtained on the previous stage by the computer 845, e.g., second data. The first data and the second data are inputted to the arithmetic units 8451 to 8454. The arithmetic units 8451 to 8454 arithmetically operate the inputted data and output arithmetic operation results to the multiplexer 8455. A type of an arithmetic operation is designated by an arithmetic operation designation from the controller 821. The arithmetic operation designation is generated by the controller 821 based on a value of the type register representing a type of an arithmetic operation. The multiplexer 8455 selects any one of the arithmetic operation results obtained in the arithmetic units 8451 to 8454 according to the arithmetic operation designation and outputs the selected arithmetic operation result.

The demultiplexer 846 inputs an input from the computer 845 to the output data register 847 or the transmitting device 83 according to control by the controller 821 which designates output unit selection. A designation of output unit selection outputs data from the computer 845 to the transmitting device 83 before the reduction operation is completed, otherwise, the designation outputs the data to the output data register 847.

The output data register 847 outputs a result of the reduction operation to the CPU 3. The reduction operation result output from the output data register 847 is inputted to the CPU 3 upon completion of the reduction operation.

When the transmitting device 83 receives an arithmetic operation result, a destination node address designated by a packet transmission designation, and a control register number from the demultiplexer 846 of the reduction operation unit, the transmitting device 83 generates a packet based on the arithmetic operation result, the destination node address, and the control register number and transmits the generated packet to the network 2.

The synchronization unit 82, as in the synchronization unit 62 of the barrier synchronization apparatus 6, performs an operation of changing transmission destinations of an intermediate result of an arithmetic operation on each stage. When the controller 821 of the synchronization unit 82 receives a synchronization signal and a control register number from the receiving device 81, the controller 821 transmits the synchronization signal to the control register 822 corresponding to the received control register number.

When the synchronization is established, the controller 821 transmits a transmission designation of a synchronization signal to the transmitting device 83. The transmission designation of the synchronization signal is expressed as a "packet transmission designation" in FIG. 10. At this time, the controller 821 transmits a synchronization signal to the designated control register 822 in the synchronization unit 82 its own process or its own node and controls the reduction operation unit 84. More specifically, the controller 821 performs a reduction operation between the data inputted to the reduction operation unit 84 and data synchronized in the storage device 844. On the other hand, when the synchronization is not established, the controller 821 causes the storage device 844 to hold the data.

In a case where a synchronization signal is transmitted to the designated control register 822 in the synchronization unit 82 of its own process or its own node, when synchronization is established, the controller 821 further controls the reduction operation unit 84 to repeat an arithmetic operation between the arithmetic operation result and the data synchronized in the storage device 844. On the other hand, when the synchronization is not established, the controller 821 transmits the arithmetic operation result to the storage device 844.

When the controller 821 receives a signal representing the start of a reduction operation from the setting processor 31, the controller 821 transmits the synchronization signal and the data inputted from the setting processor 31 to a designated pair, e.g., a transmission destination of the control register 822. Thereafter, when the synchronization is established between the final pair, the controller 821 transmits the arithmetic operation result and the signal representing the completion of the reduction operation to the setting processor 31.

Figure 13:
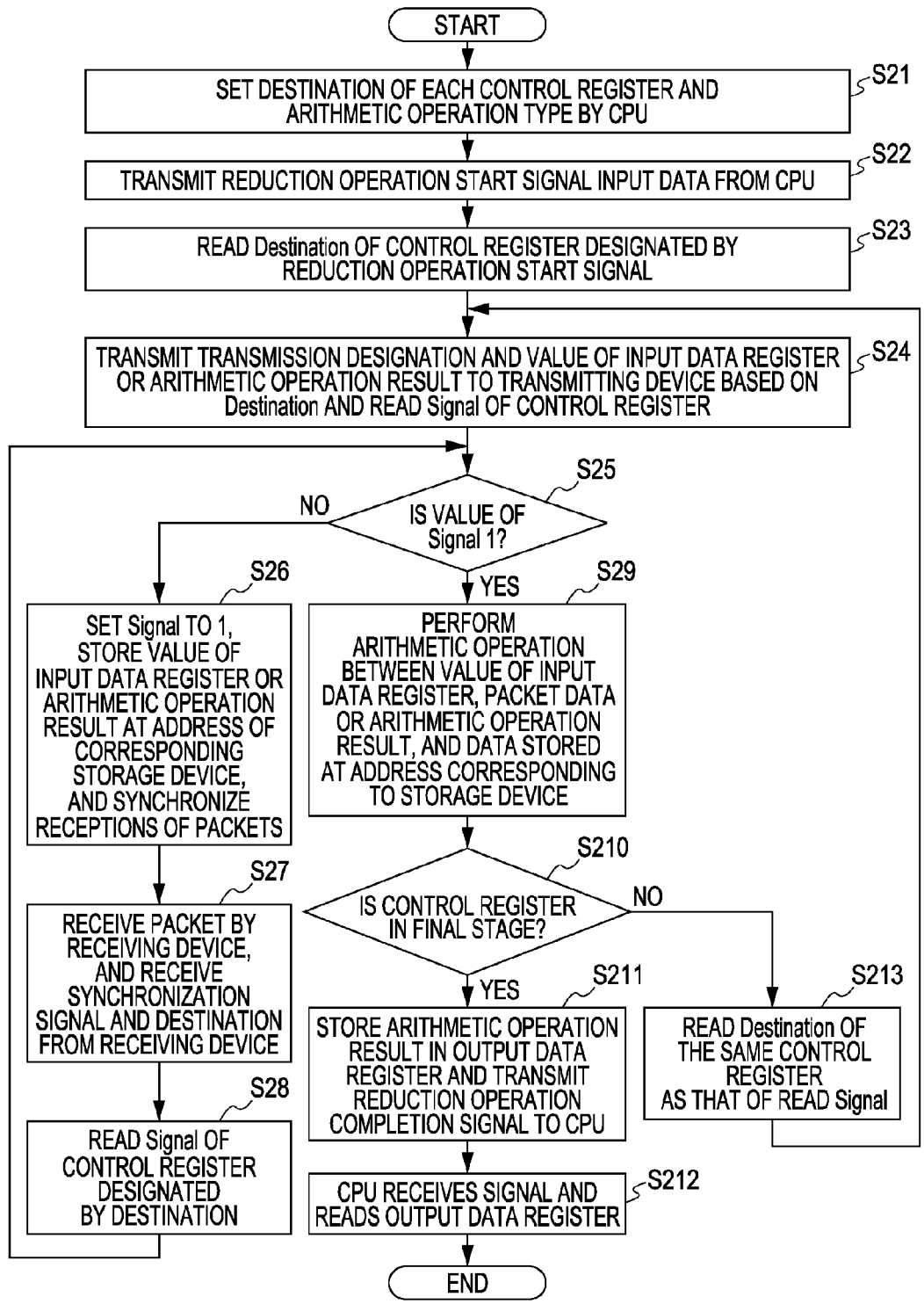
FIG. 13 is a process flow chart of execution of a reduction operation.

FIG. 13 illustrates a control flow of an operation which is executed by the reduction operation device 8 in FIG. 9 and which performs a reduction operation while performing barrier synchronization realized by a butterfly.

The reduction operation uses barrier synchronization. The process flow in FIG. 13 is almost the same as the process flow in FIG. 7 except for a transmitting/receiving process of data subjected to a reduction operation and a reduction operation process (S29).

The setting processor 31 determines the number of control registers 822 to be used based on the number of nodes which perform a reduction operation before the reduction operation is started. The setting processor 31 sets a destination node address corresponding to the next stage in a butterfly and a control register number to the destination register of each of the control registers 822 and sets an arithmetic operation type to the type register (S21).

Setting of the registers is performed as described below. When the number of nodes is a power of 2, in a butterfly, after synchronization is established, synchronization signals are transmitted to two positions, e.g., the next stage of its own process and its own node and the next stage in another node. Therefore, a destination designated for the destination register includes a control register number of its own process or its own node, a destination node address of another node, and a control register number. Since signals are not synchronized on the first stage, a signal register is not used. On the final stage, a destination register is not used. For this reason, the same control register 822 is designated on the first and final stages.

When the number of nodes is not a power of 2, as in the first embodiment, the control register 822 corresponding to a repeating stage of an addition node is provided in another node, e.g., the additional node. The additional node is set such that the control register 822 on the first stage does not communicate with the control register 822 of the final stage. Furthermore, a type register of the control register 822 of the additional node is set as passage (bypass) such that the additional node is prevented from performing an arithmetic operation.

The setting processor 31 transmits inputted data to the input data register to start a reduction operation, and transmits a reduction operation start signal to the synchronization unit 82 (S22). The reduction operation start signal includes an input register number and a control register number corresponding to the first stage.

When a signal indicating the start of a reduction operation is transmitted, the controller 821 of the synchronization unit 82 reads a value of a destination register of the control register 822 designated by a reduction operation signal (S23).

When another node is designated to a destination register, the controller 821 outputs a signal for packet transmission designation to the transmitting device 83 and transmits data to the transmitting device 83. The data transmitted to the transmitting device 83 is a value of an input data register when the control register 822 is the first stage, and the data is an arithmetic operation result from the computer 845 when the control register 822 is a subsequent stage. When the value of the input data register is transmitted to the transmitting device 83, a bypass is designated as an arithmetic operation designation. The transmitting device 83 generates a packet based on the data, a destination node address designated by a packet transmission designation, and a control register number, and transmits the packet to the network 2.

When the control register 822 of its own process or its own node is designated, the controller 821 reads a value of a signal register of the control register 822 designated by the destination register to transmit a synchronization signal to the synchronization unit 82 of its own process or its own node (S24).

The controller 821 examines whether "1" is set in the signal register (S25). When "1" is set in the signal register (Yes in S25), synchronization is established. On the other hand, when "1" is not set in the signal register (No in S25), synchronization is not established.

When the synchronization is not established, the controller 821 sets "1" in the signal register and stores data at an address corresponding to the control register 822 of the storage device 844. The data is a value of an input data register when the control register 822 is the first stage, and the data is an arithmetic operation result of the previous stage when the control register 822 is a subsequent stage. Thereafter, the controller 821 synchronizes receptions of packets from other processes (S26).

When the receiving device 81 receives a packet from another process, the receiving device 81 extracts data, a synchronization signal, and a control register number serving as a destination based on the received packet, and transmits corresponding information to the demultiplexer 846 and the synchronization unit 82 (S27).

When the synchronization unit 82 receives a synchronous signal and a control register number from the receiving device 81, the synchronization unit 82 reads a value of Signal of the designated control register 822 (S28). Thereafter, the operations subsequent to S25 are repeated.

On the other hand, when synchronization is established in S25, an arithmetic operation is performed (S29). Data to be arithmetically operated is a value of an input data register when the control register 822 corresponds to the next stage of the first stage. When the control register 822 corresponds to the subsequent stages and when a factor of synchronization establishment is a synchronization signal from a packet, the data is data included in the packet. When the received synchronization signal is a synchronization signal from the synchronization device of its own process or its own node, an arithmetic operation is performed between an arithmetic operation result on the previous stage and data stored at an address in the storage device 844 corresponding the control register 822 the synchronization of which is established. When the received information is an arithmetic operation result, a type of an arithmetic operation is designated from a value of a type register.

Furthermore, the controller 821 examines whether the control register 822 corresponds to the final stage (S210).

When synchronization is established in the control register 822 corresponding to the final stage (Yes in S210), the controller 821 stores an arithmetic operation result in an output data register and transmits a signal indicating the completion of a reduction operation to the setting processor 31 (S211).

The setting processor 31 receives the signal indicating the completion of the reduction operation from the controller 821 and reads an arithmetic operation result from an output data register (S212).

When the control register 822 does not correspond to the final stage in S210 (No in S210), a value of a destination register of the control register 822 the synchronization of which is established is read (S213). Thereafter, operations subsequent to S24 are repeated.

Figure 14:
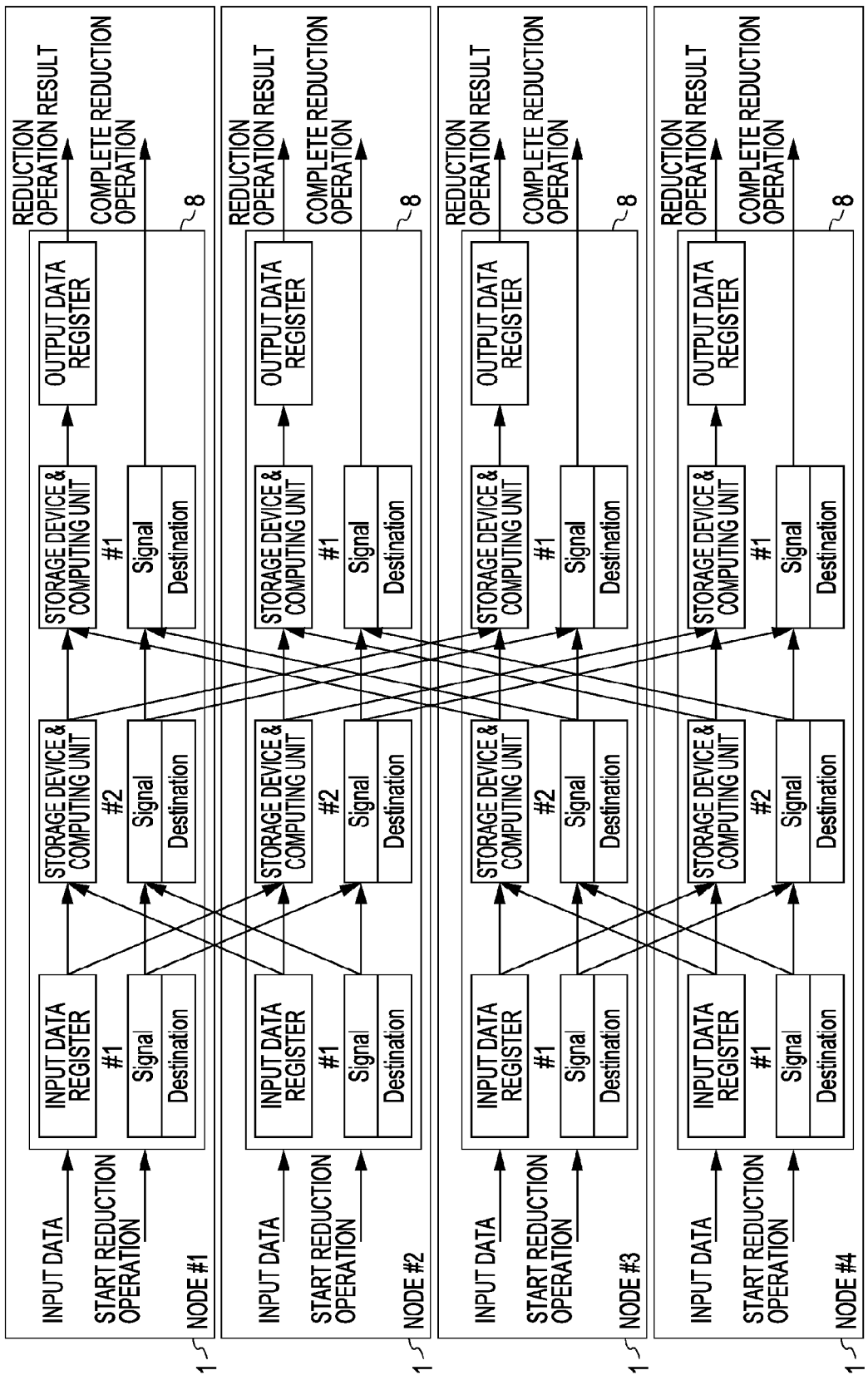
FIG. 14 is a diagram illustrating flows of data and signals in a reduction operation performed by a butterfly network.

FIG. 14 illustrates a flow of a synchronization signal between stages in a reduction operation process realized by a butterfly in FIG. 13.

In FIG. 14, with respect to the node #1, data subjected to synchronization signal reduction and an arithmetic operation flows as described below. For example, when the node #1 receives inputted data serving as data to be arithmetically operated, the start of a reduction operation is designated by inputting a reduction operation start signal. According to this, the node #1, on the stage #1, transmits a synchronization signal and the data to be arithmetically operated to the node #1 and the node #2 which are destinations designated in advance.

On the stage #2, the node #1 which receives its own synchronization signal and data to be arithmetically operated synchronizes the synchronization with a synchronization signal from the node #2 which is designated in advance, and holds the received data to be arithmetically operated in the storage device and the computer. The synchronization signal of the stage #2 and the data to be arithmetically operated are outputted from the node #2 and then arrive at the node #1 after the node #2 receives the input data. When the synchronization signal from the node #2 arrives at the node #1, in the node #1, synchronization between its own synchronization signal and the synchronization signal from the node #2, e.g., synchronization between the two signals, is established. When the synchronization is established, the node #1, on the stage #2, executes an arithmetic operation between its own data to be arithmetically operated and data to be arithmetically operated from the node #2, and a synchronization signal and an arithmetic operation result are transmitted to the node #1 and the node #3 which are destinations designated in advance. The arithmetic operation result is used as data to be arithmetically operated in the node #1 and the node #3.

On the stage #3, the node #1 which receives its own synchronization signal and data to be arithmetically operated synchronizes the synchronization signal with the synchronization signal from the node #3 designated in advance and holds the received data to be arithmetically operated in the storage device and the computer. The synchronization signal of the stage #3 and the data to be arithmetically operated are similarly outputted from the node #3 and arrive at the node #1 after the node #3 receives the input data and a synchronization signal from the node #4 which receives inputted data is received. When the synchronization signal from the node #3 arrives at the node #1, in the node #1, synchronization between its own synchronization signal and the synchronization signal from the node #3 is established. When the synchronization is established, the node #1, on the stage #3, executes an arithmetic operation between its own data to be arithmetically operated and data to be arithmetically operated from the node #3, and outputs an arithmetic operation result to an output data register designated in advance. Thereafter, the node #1 outputs a reduction operation completion signal and the data held in the output data register as a reduction operation result. Also in the nodes #2 to #4, similarly, on the stage #3, synchronization is established, and the reduction operation completion signal and the reduction operation result are outputted. In this manner, a reduction operation realized by a butterfly is executed.

Therefore, flows of the synchronization signal and the data to be arithmetically operated in FIG. 14 are the same as the flows illustrated in FIG. 4. It is understood that a reduction operation using barrier synchronization realized by a butterfly is executed.

A third embodiment relates to a barrier synchronization apparatus which performs barrier synchronization realized by dissemination. More specifically, in the third embodiment, an algorithm of barrier synchronization is dissemination.

The barrier synchronization realized by the butterfly employed in the first embodiment cannot cope with a case in which the number of processes is not a power of 2. In this case, in order to execute barrier synchronization realized by a butterfly, a process is virtually added to make the number of processes a power of 2. Communication of the virtual process is substitutionally performed by a real process. For this reason, since a real process allocated to a virtual process must perform communication performed for a virtual process, the number of stages increases.

Figure 15:
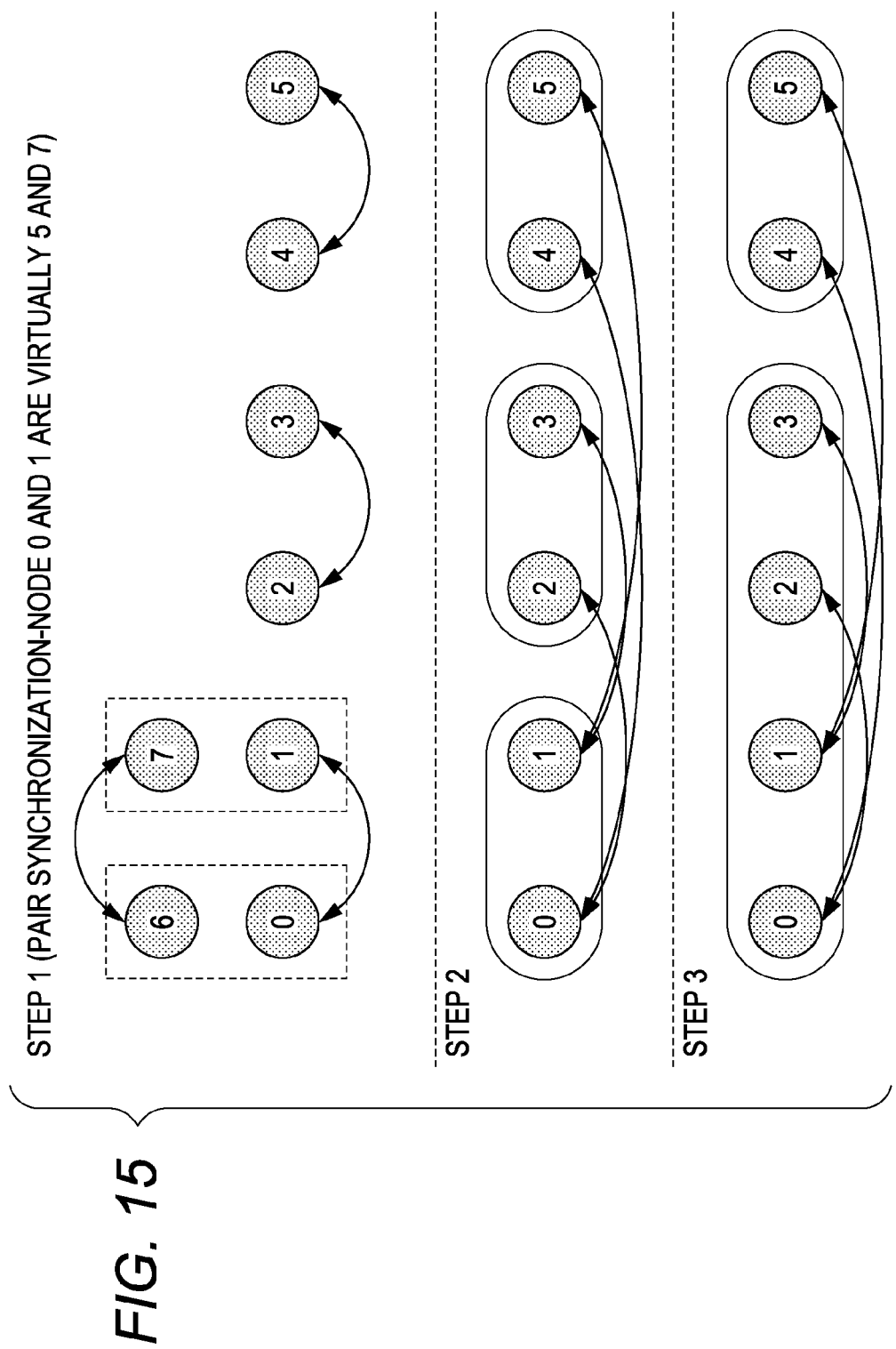
FIG. 15 is a diagram illustrating an embodiment of barrier synchronization performed by a butterfly in 6 processes.

FIG. 15 illustrates an example in which barrier synchronization realized by a butterfly is performed by six processes #0 to #5. In this case, in addition to the real processes #0 to #5, virtual processes #6 and #7 are added. In this manner, the number of processes is a power of 2. In this case, the real processes #0 and #1 perform communication performed for the virtual processes #6 and #7. The real processes #0 and #1 perform communication performed as a real process and communication performed as a virtual process. For this reason, the number of stages becomes 6 in the example in FIG. 15.

In step 1, the real processes #0 and #1 communicate with each other, the real processes #2 and #3 communicate with each other, and the real processes #4 and #5 communicate with each other. Thereafter, the real processes #0 and #1 serving as the virtual processes #6 and #7 communicate with each other. The communication between the real processes #0 and #1 and the communication between the virtual processes #6 and #7 cannot be simultaneously performed. Therefore, the number of stages in step 1 is 2 which is obtained by summing up the former communication and the latter communication.

In step 1, the processes #0, #1, #6, and #7 are illustrated as independent processes, respectively. A process obtained by surrounding the processes #0 and #6 with a dotted line is the real process #0. This is also applied to the processes #1 and #7. In step 2 and step 3, the virtual processes #6 and #7 are not illustrated.

In step 2, the real process #0 communicates with the real process #2 and also communicates with the real process #4 as the virtual process #6. These communications cannot be simultaneously performed. This is also applied to the real process #1. Therefore, the number of stages in step 2 is 2. Similarly, also in step S3, the number of stages becomes 2. Therefore, the total number of stages becomes 6.

In order to solve this problem, as an algorithm of barrier synchronization, in place of a butterfly, dissemination is proposed.

Figure 16:
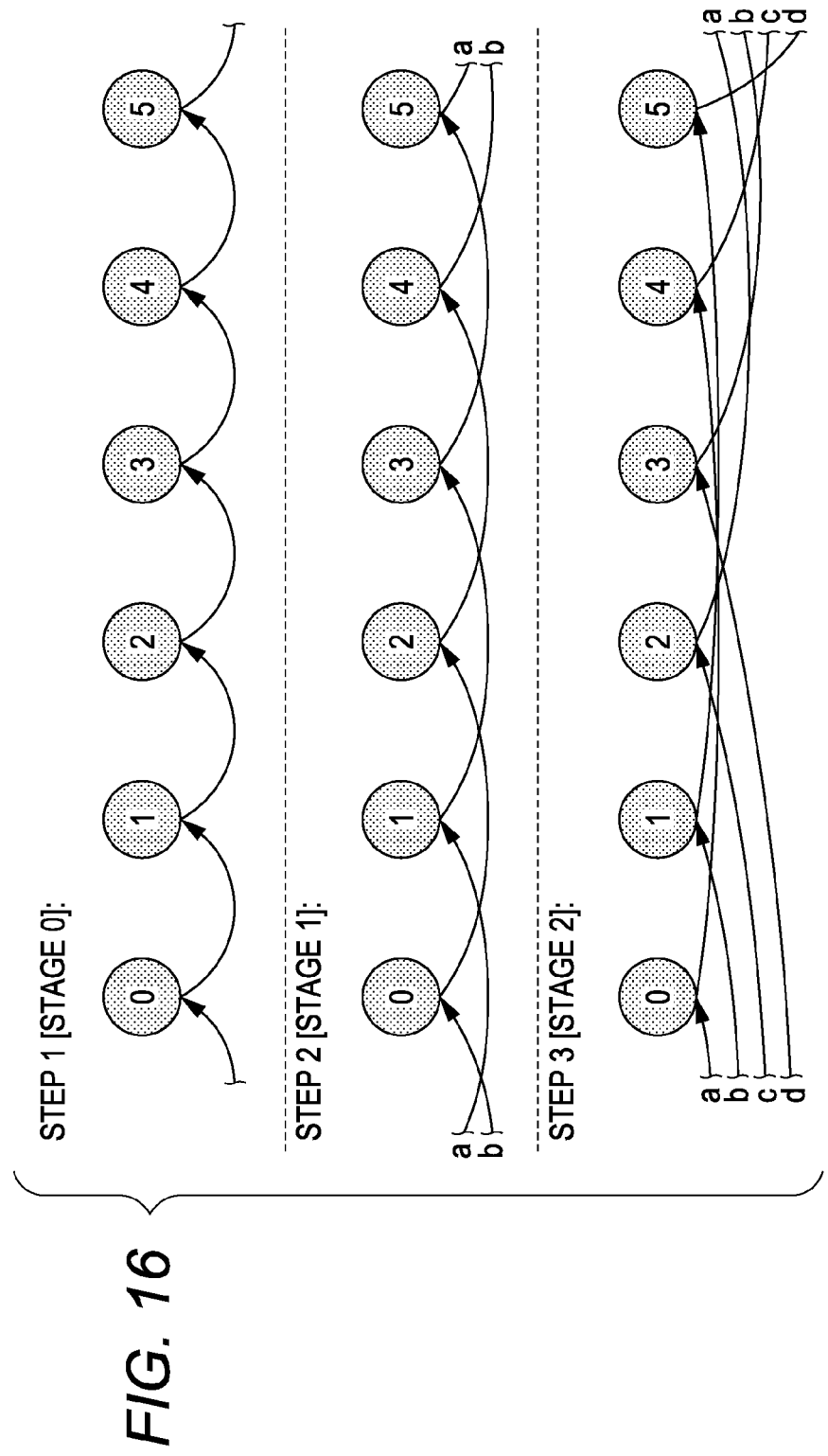
FIG. 16 is a diagram illustrating an embodiment of barrier synchronization performed by dissemination in 6 processes.

FIG. 16 illustrates an example in which barrier synchronization realized by dissemination is performed by six processes. The dissemination is an algorithm in which when a stage number, a process number of its own process or its own node 1, and the total number of processes are represented by k, i, and N, a transmission destination of a signal representing that processes arrive at a barrier point is given by i+2^(k−1) modN.

In step 1, each real process transmits a synchronization signal to a first next real process. For example, the real process #0 returns a synchronization signal to the real process #1. The final real process transmits a synchronization signal to the real process #0. In step 2, each real process transmits a synchronization signal to a second next real process. In step 3, each real process transmits a synchronization signal to a third next real process.

In this manner, after a synchronization signal is transmitted log(N) (base of a logarithm=2) times, a certain real process receives synchronization signals from all other real processes. As a result, since the number of stages is always log(N) (base of a logarithm=2), even though the number of processes is not a power of 2, efficiency higher than that in FIG. 15 can be obtained.

A computer network according to a third embodiment includes the same configuration as that of the first embodiment. More specifically, the node 1 illustrated in FIG. 2 is arranged in the third embodiment, in the computer network illustrated in FIG. 1, the barrier synchronization apparatus 6 illustrated in FIG. 5 is arranged in the node 1, and the synchronization unit 62 illustrated in FIG. 6 is arranged in the barrier synchronization apparatus 6.

In the third embodiment, as a destination register of the control register 622, the control register 622 serving as a next state in barrier synchronization realized by dissemination is set. In this manner, the barrier synchronization realized by dissemination can be performed.

In the third embodiment, the barrier synchronization is executed by the same process flow as the process flow illustrated in FIG. 7. However, in the third embodiment, in the controller 621 of the synchronization unit 62, determination about a read value of a destination register of the corresponding control register 622 in step S14 in FIG. 7 is omitted. More specifically, in the third embodiment, determination to designate any one of the control register 622 of its own node 1 and a control register of another node is not performed. This is because, in the barrier synchronization realized by dissemination, a communication source and a communication destination on each stage are two registers, e.g., the control register 622 of its own node 1 and a control register of another node.

Figure 17:
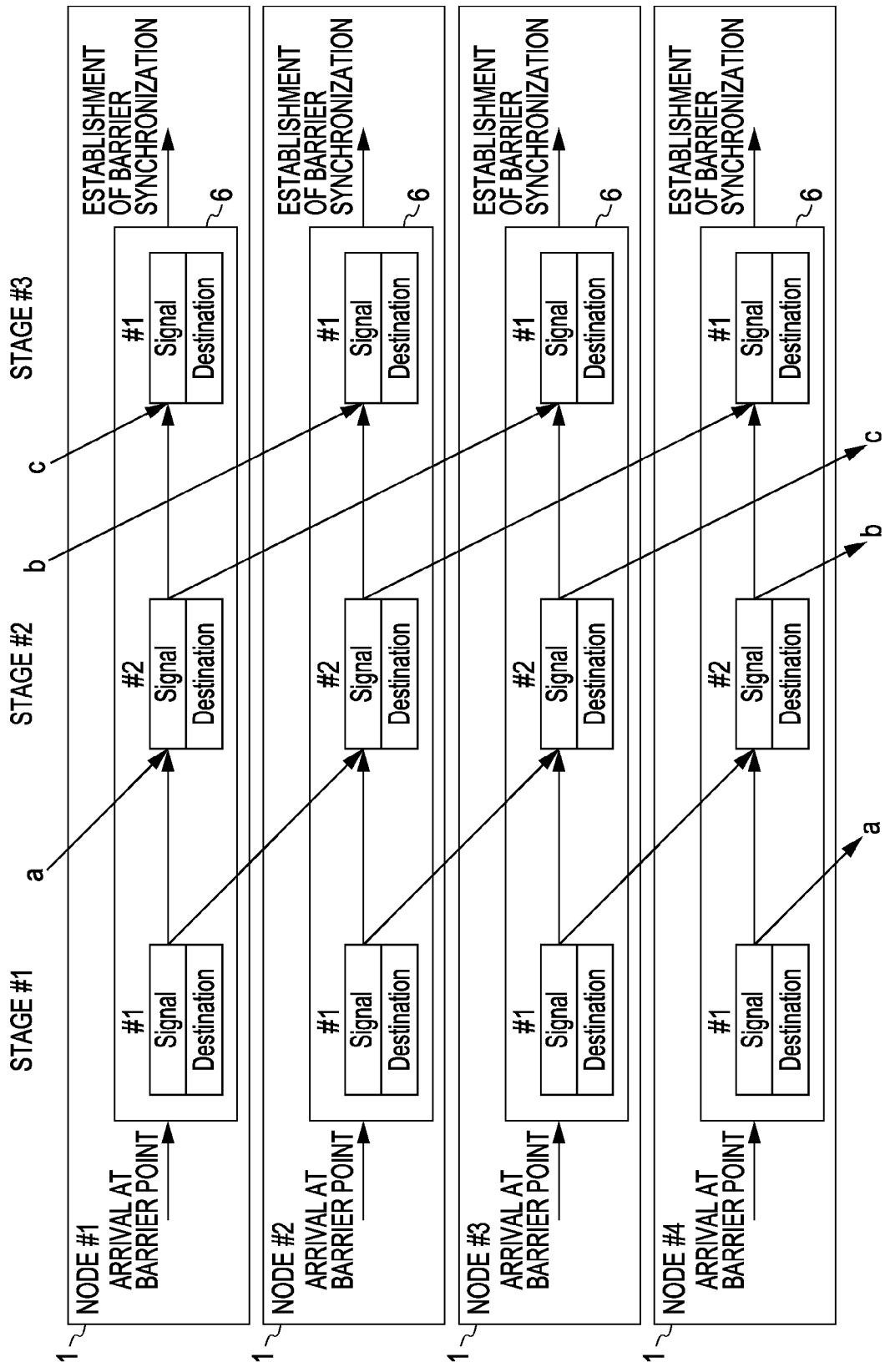
FIG. 17 is a diagram illustrating flows of signals in barrier synchronization performed by dissemination.

FIG. 17 illustrates a flow of a synchronization signal between stages in a barrier synchronization process realized by dissemination. FIG. 17 illustrates an example in which barrier synchronization realized by dissemination is performed is performed by four processes. Therefore, a reference symbol d which is present in FIG. 16 is not present in FIG. 17.

In FIG. 17, with respect to the node #1, a synchronization signal flows as described below. More specifically, a synchronization signal arrives at the node #1, on the stage #1, the synchronization signal is transmitted from the node #1 to the node #1 and the node #2. The synchronization signal on the stage #2, as indicated by a reference symbol a in FIG. 17, is output from the node #4 and arrives at the node #1. When the synchronization signal from the node #4 arrives at the node #1, in the node #2, the synchronization signal is transmitted from the node #1 to the node #1 and the node #3. The synchronization signal on the stage #3, as indicated by a reference symbol c in FIG. 17, is output from the node #3 and arrives at the node #1. When the synchronization signal from the node #3 arrives at the node #1, on the stage #3, it is determined that synchronization is established, and the synchronization signal is output from the node #1.

Also in the nodes #2 to #4, by the same manner as described above, on the stage #3, synchronization is established, and a synchronization signal is output. In this manner, barrier synchronization realized by dissemination is executed.

Figure 18:
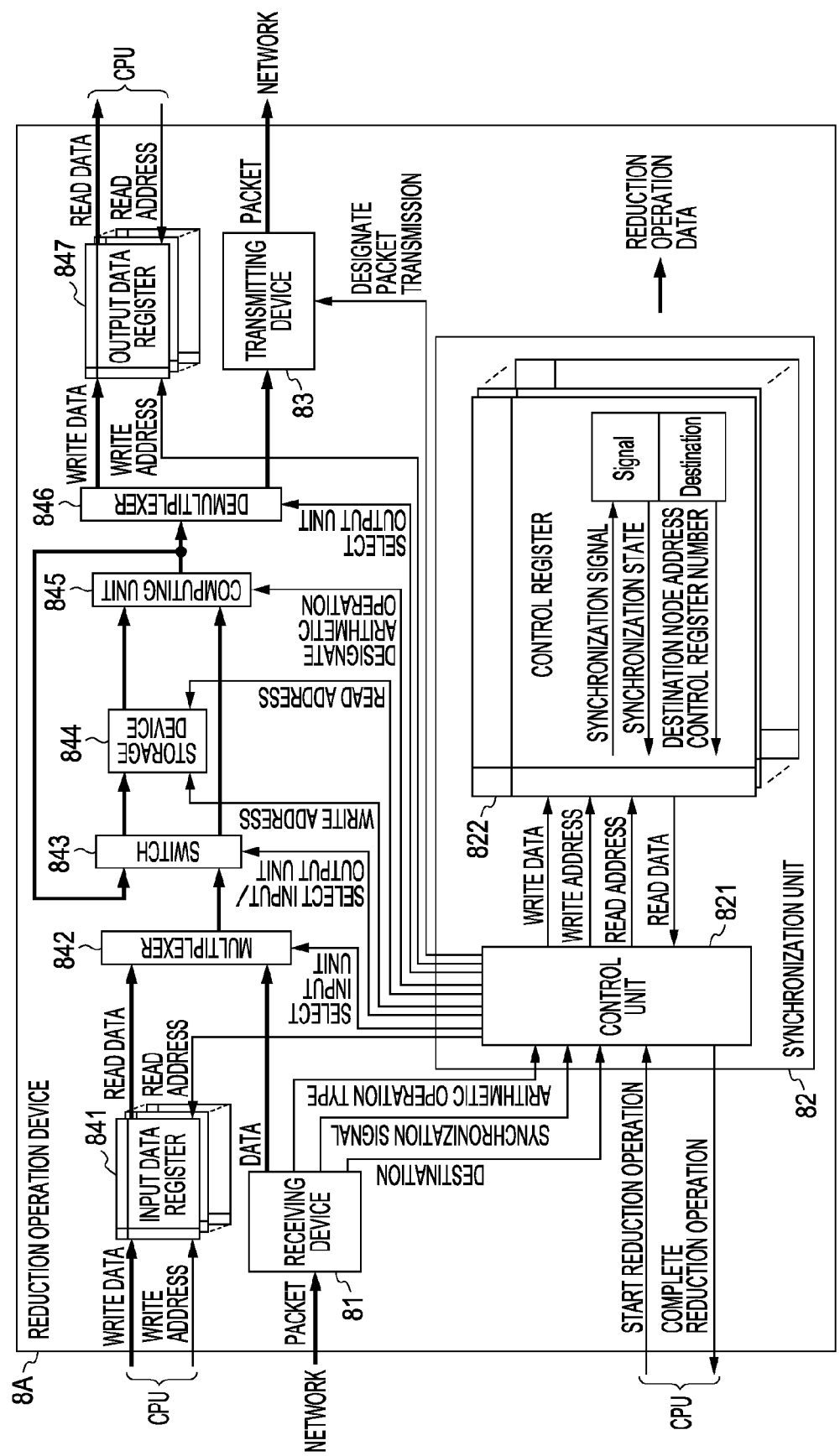
FIG. 18 is a diagram illustrating a configuration of a reduction operation unit according to an embodiment.

FIG. 18 illustrates an example of a configuration of the synchronization unit 82 and a reduction operation unit included in a reduction operation device according to a fourth embodiment. The fourth embodiment relates a reduction operation device which performs a reduction operation while performing barrier synchronization by dissemination.

The fourth embodiment basically includes the same configuration as that of the second embodiment. More specifically, in the fourth embodiment, the node 1 illustrated in FIG. 2 is arranged in the computer network illustrated in FIG. 1, and the reduction operation device 8 illustrated in FIG. 9 is arranged in the node 1.

On the other hand, in the fourth embodiment, in place of the reduction operation device 8 illustrated in FIG. 10, a reduction operation apparatus 8A is arranged as illustrated in FIG. 18. The reduction operation apparatus 8A basically includes the same configuration as that of the reduction operation device 8. However, in the reduction operation apparatus 8A, the type register of the control register 822 is omitted.

For this reason, in the fourth embodiment, a packet includes information representing an arithmetic operation type. Since the arithmetic operation type can be known in advance, prior to a reduction operation, the arithmetic operation type is input to the setting processor 31 of the CPU 3 as some of setting conditions for the reduction operation. The receiving device 81 transmits the received arithmetic operation type to the controller 821 of the synchronization unit 82. The controller 821 adds the information of the arithmetic operation type to a signal of a packet transmission designation from the synchronization unit 82 and transmits the resultant signal to the transmitting device 83. The transmitting device 83 adds the received information of the arithmetic operation type to a predetermined position of a packet to be transmitted to generate a transmission packet.

In the fourth embodiment, as a destination register of the control register 822, the control register 822 serving as a next stage in a reduction operation performed by barrier synchronization realized by dissemination is set. In this manner, the reduction operation performed by barrier synchronization realized by dissemination can be performed.

In the fourth embodiment, the reduction operation is executed by the same process flow as the process flow illustrated in FIG. 13. However, in the fourth embodiment, the controller 821 of the synchronization unit 82 omits determination about a value of a type register of the control register 822 in S21. In the fourth embodiment, in step S22, a reduction operation start signal includes information of an arithmetic operation type. Furthermore, in the fourth embodiment, in S24, the controller 821 adds information which designates a arithmetic operation type to a packet transmission designation, and the transmitting device 83 generates a packet having the information of the arithmetic operation type. In the fourth embodiment, in S29, the arithmetic operation type is designated based on a signal of an arithmetic operation type from the receiving device 81. In the fourth embodiment, in S27, the arithmetic operation type is added to a signal transmitted from the receiving device 81 to the synchronization device.

The controller 821 omits determination about a read value of a destination register of the corresponding control register 822 in S24.

In this manner, as in FIG. 17, a flow of a synchronization signal between stages in a reduction operation process by dissemination is realized.

A fifth embodiment relates to a barrier synchronization apparatus which performs barrier synchronization by pairwise exchange with recursive doubling. More specifically, in this example, an algorithm of barrier synchronization is pairwise exchange with recursive doubling.

As described above, the drawback of barrier synchronization realized by a butterfly is that the barrier synchronization cannot cope with processes the number of which is not a power of 2. As an algorithm of barrier synchronization, in place of a butterfly, in addition to the dissemination explained in the third embodiment, the pairwise exchange with recursive doubling is proposed.

Figure 19:
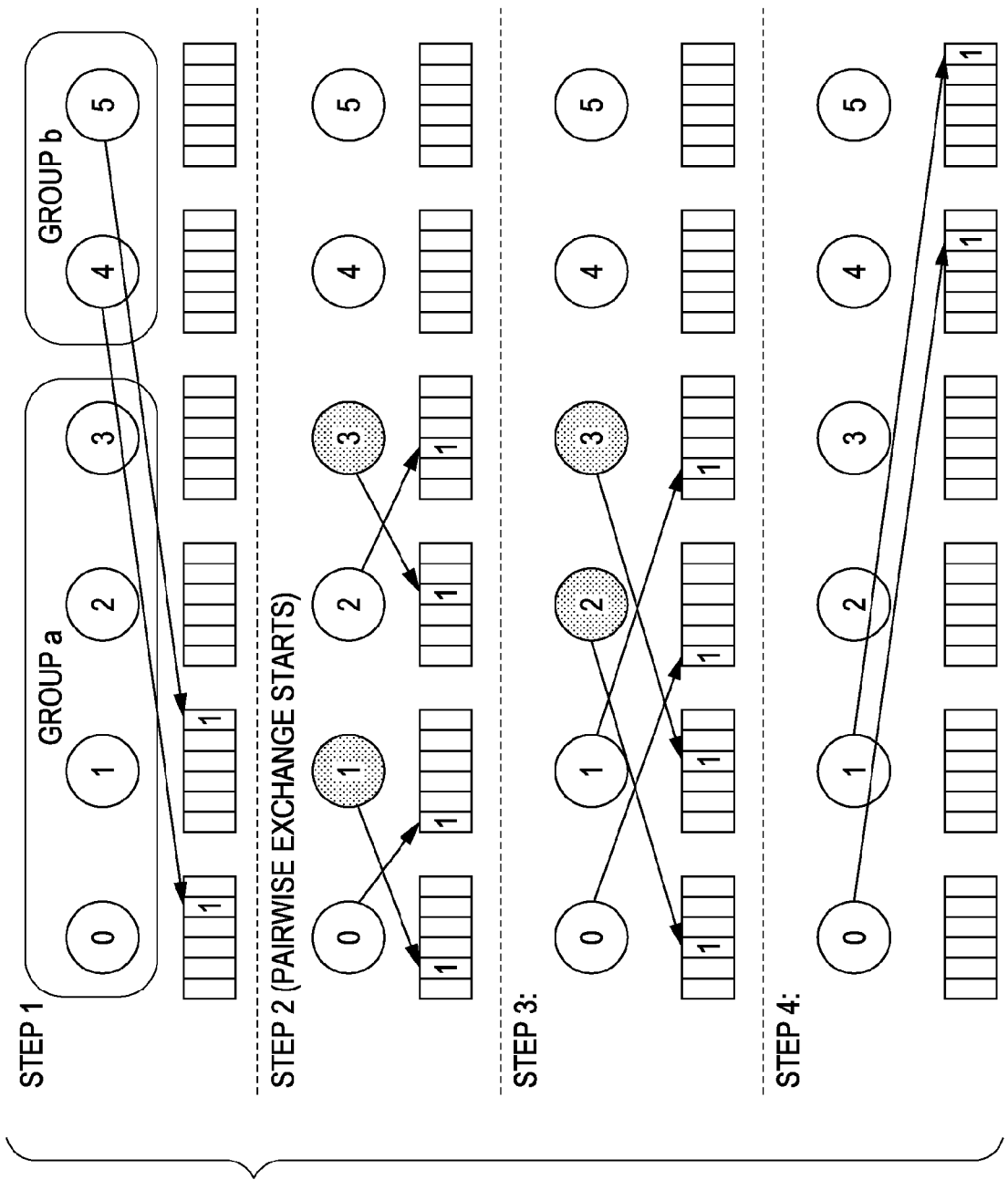
FIG. 19 is a diagram illustrating an embodiment of barrier synchronization performed by pairwise exchange with recursive doubling in 6 processes.

FIG. 19 illustrates an example in which barrier synchronization realized by pairwise exchange with recursive doubling is performed by six processes. The pairwise exchange with recursive doubling classifies processes into a group of a power of 2 and a remaining group. In FIG. 19, group a indicates the group of a power of 2, and group b indicates the remaining group. In the example in FIG. 19, the group a includes four processes #0 to #3, and the group b includes processes #4 and #5.

On the first stage, communication from the remaining group b to the group a of a power of 2 is performed (step 1). For example, synchronization signals are transmitted from the processes #4 and #5 of the group b to the processes #0 and #1 of the group a, respectively. The processes #0 and #1 of the group a store the received synchronization signals in signal registers. In FIG. 19, the signal register included in each process is expressed by a square corresponding to each process expressed by a circle. For example, the process #0 of the group a stores "1" in a fifth bit serving as a bit corresponding to the process #4 in the signal register. The same operation is performed to the process #1.

Thereafter, communication is performed in the group a of a power of 2 (step 2 to step 3). For example, the processes #0 and #1 communicates with each other, and the processes #2 and #3 communicate with each other. Subsequently, the processes #0 and #2 communicate with each other, and the processes #1 and #3 communicate with each other. In this manner, synchronization is established in the group a of a power of 2.

When synchronization can be established in the group a of a power of 2, communication from the group a of a power of 2 to the remaining group b is performed (step 4). For example, a synchronization signal is transmitted from the processes #0 and #1 of the group a to the processes #4 and #5 of the group b. In this manner, synchronization between the group a and the group b, i.e., the process of the group a and the process of the group b is established.

A computer network according to the fifth embodiment includes the same configuration as that in the first embodiment. More specifically, in the fifth embodiment, the node 1 illustrated in FIG. 2 is arranged in the computer network illustrated in FIG. 1, the barrier synchronization apparatus 6 illustrated in FIG. 5 is arranged in the node 1, and the synchronization unit 62 illustrated in FIG. 6 is arranged in the barrier synchronization apparatus 6.

In the fifth embodiment, as a destination register of the control register 622, the control register 622 serving as a next stage in barrier synchronization performed by pairwise exchange with recursive doubling is set. In this manner, as in the first embodiment, barrier synchronization realized by dissemination can be performed.

In the fifth embodiment, the barrier synchronization is executed by the same process flow as the process flow illustrated in FIG. 7. However, in the fifth embodiment, as is apparent from FIG. 20, the controller 621 of the synchronization unit 62 does not set the same control register 622 on the first stage and the final stage in S11 in FIG. 7.

For example, with respect to the node #1 of the group a, on the first stage, in order to designate a destination on the next stage, a destination register is used. On the other hand, also on the final stage, in order to designate the node #5 of the group b as a destination, a destination register is used. Therefore, on the first stage and the final stage, the same register is used. For this reason, on the first and final stages, the same control register 622 is not designated. More specifically, in FIG. 20, on the first stage and the final stage, different control register numbers #1 and #4 are designated. This is also applied to the node #2 of the group a.

Figure 20:
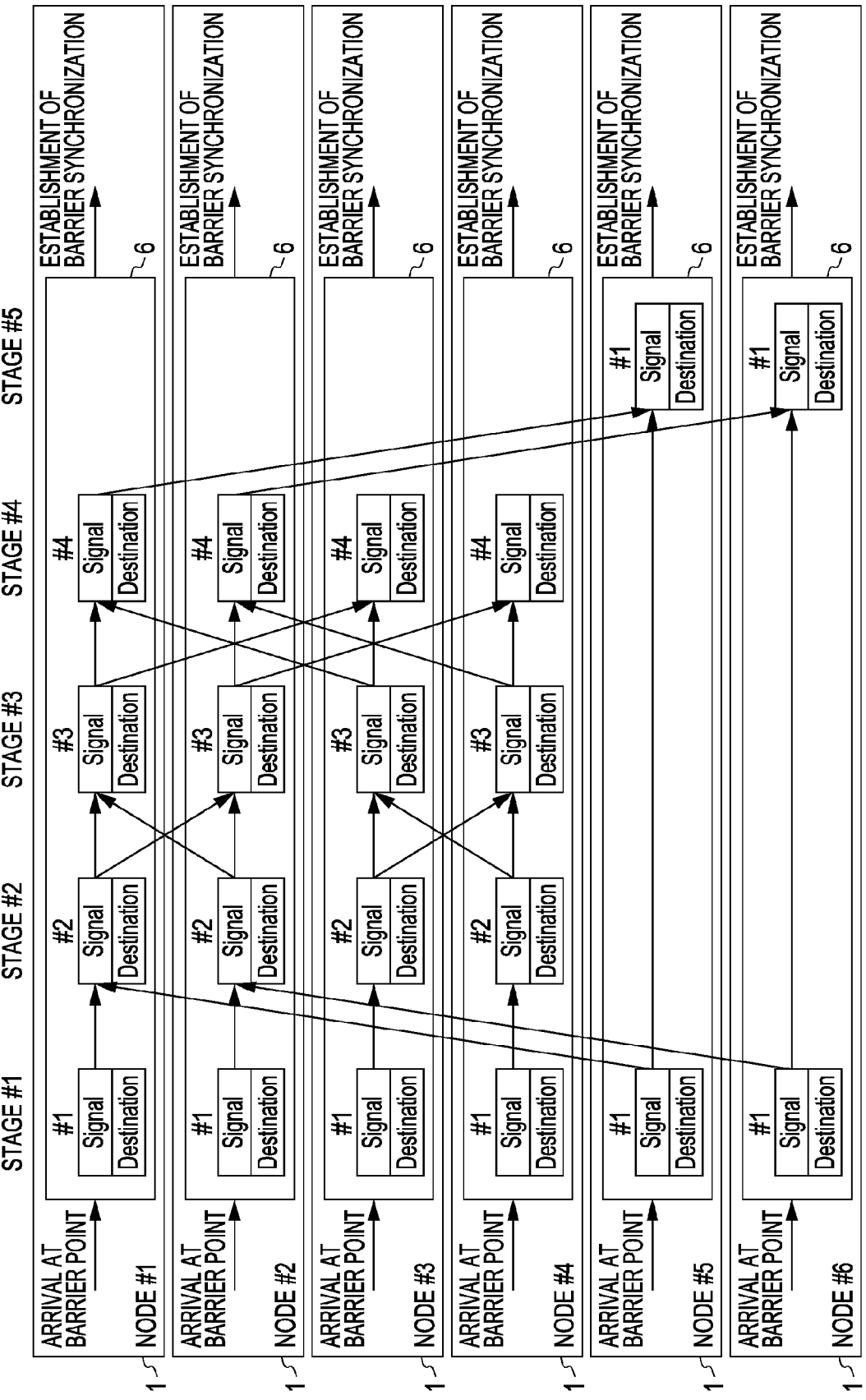
FIG. 20 is a diagram illustrating flows of signals in barrier synchronization performed by pairwise exchange with recursive doubling.

When the groups a and b are determined, nodes which operate as the nodes #1 and #2 in FIG. 20 are not fixed. Therefore, on the first stage and the final stage, the same control register 622 is prevented from being set.

In S19, even on the final stage of barrier synchronization, when a communication destination is designated in a destination register of the control register 622, the communication is performed. In the pairwise exchange with recursive doubling, a node in which barrier synchronization is established on different stages is present. For this reason, even after the barrier synchronization is established, a node which communicates with another node is present. Therefore, since a node in which the same control register 622 cannot be set on the first stage and the final stage is present, the same control register 622 is not set on the first stage and the final stage.

FIG. 20 illustrates a flow of a synchronization signal between stages in a barrier synchronization process realized by the pairwise exchange with recursive doubling.

In FIG. 20, with respect to the node #1 of the group a, a synchronization signal flows as described below. More specifically, a synchronization signal arrives at the node #1, on the stage #1, the synchronization signal is transmitted to the node #1. The synchronization signal on the stage #2 is outputted from the node #5 of group b and arrives at the node #1. When the synchronization signal arrives at the node #1, on the stage #2, the synchronization signal is transmitted from the node #1 to the node #1 and the node #2. The synchronization signal on the stage #3 is outputted from the node #2 and arrives at the node #1. When the synchronization signal arrives at the node #1, on the stage #3, the synchronization signal is transmitted from the node #1 to the node #1 and the node #4. The synchronization signal on the stage #4 is outputted from the node #3 and arrives at the node #1. When the synchronization signal arrives at the node #1, on the stage #4, it is determined that synchronization is established, a synchronization signal is outputted from the node #1, and the synchronization signal is transmitted to the node #5 of the group b.

Also in the nodes #2 to #4, as illustrated in FIG. 20, by almost the same manner as described above, on the stage #4, synchronization is established, and a synchronization signal is output.

On the other hand, with respect to the node #5 of the group b, a synchronization signal flows as described below. More specifically, on the stage #1, a synchronization signal is transmitted from the node #5 to the node #1. Thereafter, on the stages #2 to #4, since no synchronization signal is inputted to the node #5, the same operations as described above are performed. On the stage #5, when a synchronization signal from the node #1 is inputted to the node #5, it is determined that synchronization is established, and the synchronization signal is outputted from the node #5. Also in the node #6, almost the same operation as in the node #5 is performed. In this manner, barrier synchronization realized by pairwise exchange with recursive doubling is executed.

A sixth embodiment relates to a reduction operation device which performs a reduction operation while performing barrier synchronization realized by pairwise exchange with recursive doubling.

The sixth embodiment includes the same configuration as that of the second embodiment. More specifically, in the configuration of the sixth embodiment, the node 1 illustrated in FIG. 2 is arranged in the computer network illustrated in FIG. 1, the reduction operation device 8 illustrated in FIG. 9 is arranged in the node 1, and a reduction operation device 8 illustrated in FIG. 10 is used.

In the sixth embodiment, as a destination register of the control register 822, the control register 822 serving as a next stage in a reduction operation performed by barrier synchronization realized by pairwise exchange with recursive doubling is set. In this manner, as in the second embodiment, a reduction operation by barrier synchronization realized by pairwise exchange with recursive doubling can be performed.

In the sixth embodiment, a reduction operation is executed by the same process flow as the process flow illustrated in FIG. 13. However, also in the sixth embodiment, as in the fifth embodiment, the same control register 822 is set on the first stage and the final stage in S11. In S19, even on the final stage of the barrier synchronization, when a communication destination is designated in a destination register of the control register 822, the communication is performed.

In the sixth embodiment, a flow of a synchronization signal between stages in a process of performing a reduction operation while barrier synchronization by a barrier realized by pairwise exchange with recursive doubling is the same as that in FIG. 20. In this manner, the reduction operation is executed while performing the barrier synchronization by the pairwise exchange with recursive doubling.

A seventh embodiment relates to a barrier synchronization apparatus which performs barrier synchronization by a butterfly.

Figure 21:
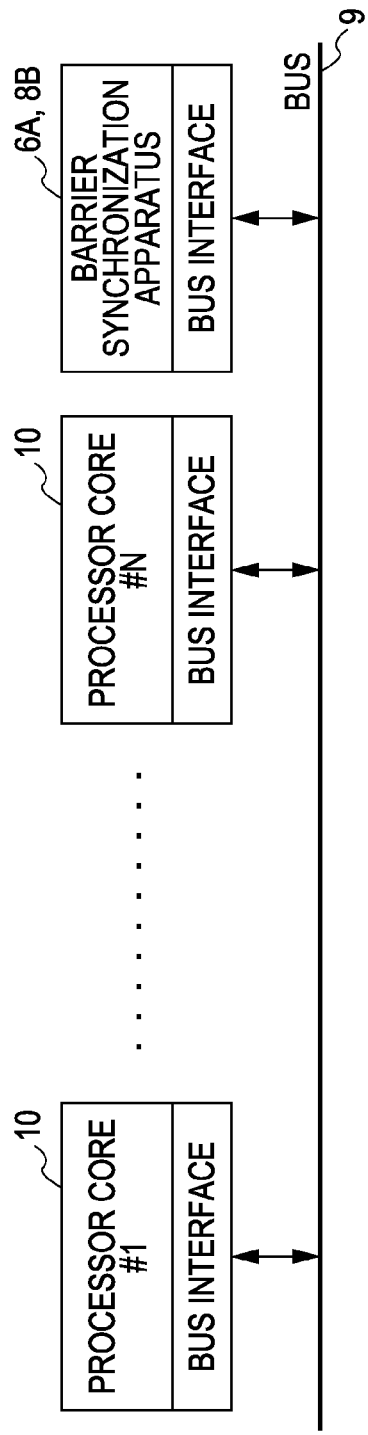
FIG. 21 is a diagram illustrating a configuration of a multi-core processor.
Figure 22:
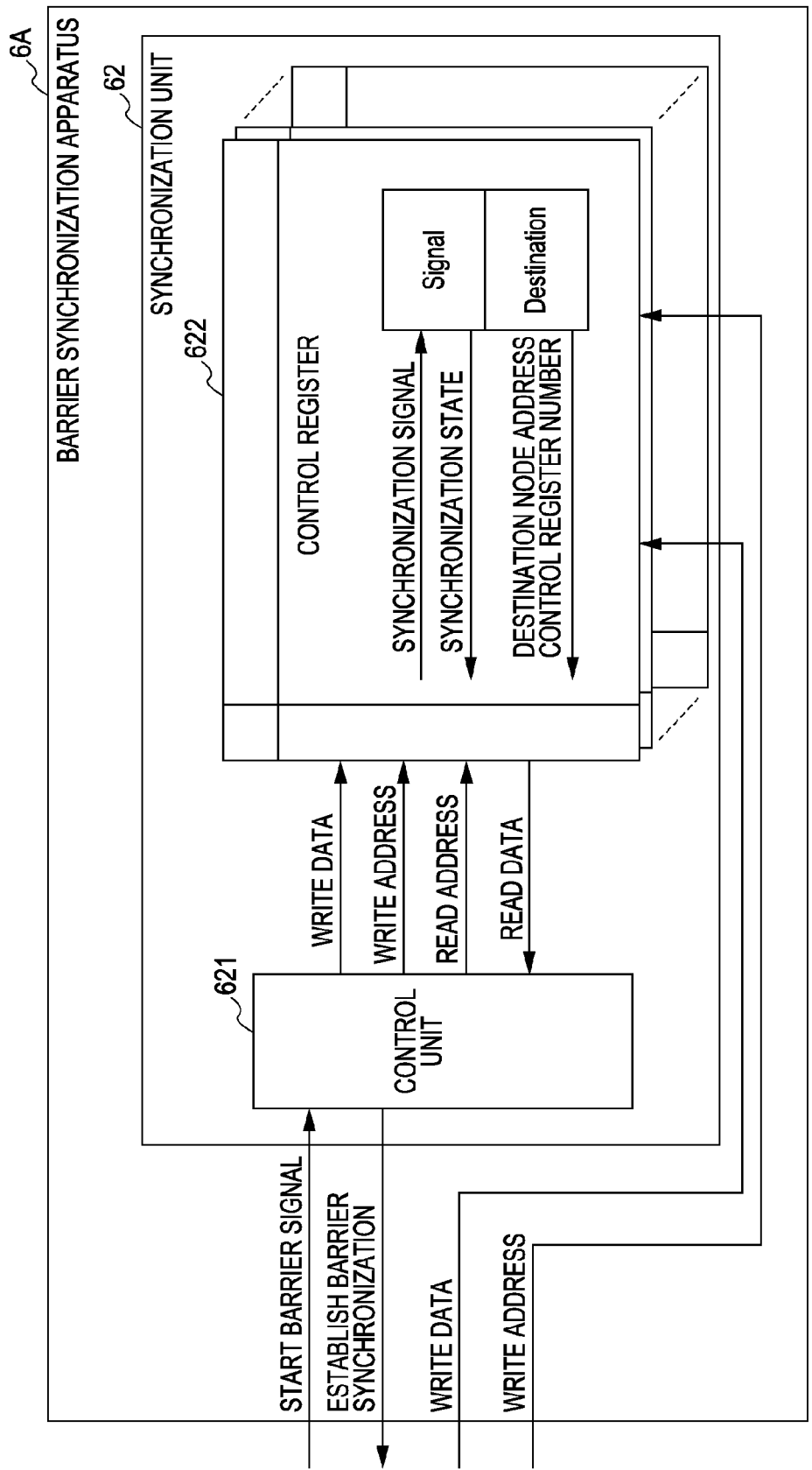
FIG. 22 is a diagram illustrating a configuration of a synchronization apparatus according to an embodiment.

FIG. 21 illustrates a configuration of a computer system which includes a barrier synchronization apparatus according to the seventh embodiment and is configured by a multiprocessor (multiprocessor core). FIG. 22 illustrates a barrier synchronization apparatus in the computer system in FIG. 21.

In the seventh embodiment, the barrier synchronization apparatus 6A is not arranged in each processor core 10 unlike in the first embodiment, and is arranged independently of the processor core. More specifically, in the seventh embodiment, the plurality of processor cores 10 are connected to each other through a bus 9, and the barrier synchronization apparatus 6A is connected to the bus 9. In this manner, the plurality of processor cores 10 are connected to the barrier synchronization apparatus 6A through the bus 9. In place of the bus 9, various networks may be used.

In the seventh embodiment, the barrier synchronization apparatuses 6A do not communicate with each other. For this reason, the barrier synchronization apparatus 6A does not include the receiving device 61 and the transmitting device 63 unlike in the first embodiment. More specifically, the barrier synchronization apparatus 6A according to the seventh embodiment has a configuration obtained by omitting the receiving device 61 and the transmitting device 63 in the barrier synchronization apparatus 6 according to the first embodiment illustrated in FIG. 6. In place of this, each of the plurality of processor cores 10 and the barrier synchronization apparatus 6A includes a bus interface. All inputted signals and all outputted signals are inputted or outputted through the bus interfaces.

In the seventh embodiment, for each of the processor cores 10 connected to the barrier synchronization apparatus 6A, the corresponding control register 622 is predetermined in the barrier synchronization apparatus 6A. In this manner, for example, when barrier synchronization is executed by the four processor cores 10, barrier synchronization can be performed by the same manner as in FIG. 4 in the first embodiment. As a result, as in the case in which the barrier synchronization apparatus 6A is arranged in the processor core 10, barrier synchronization can be performed.

In the seventh embodiment, the plurality of control registers 622 corresponding to the plurality of processor cores 10 are present in the same barrier synchronization apparatus 6A. Therefore, broadcasting between the plurality of barrier synchronization apparatuses 6 is not necessary. In place of this, the controller 621 refers to the plurality of control registers 622.

An eighth embodiment relates to a reduction operation device which performs barrier synchronization by a butterfly.

In the eighth embodiment, in place of the barrier synchronization apparatus 6A in the seventh embodiment, a reduction operation device 8B is arranged.

Figure 23:
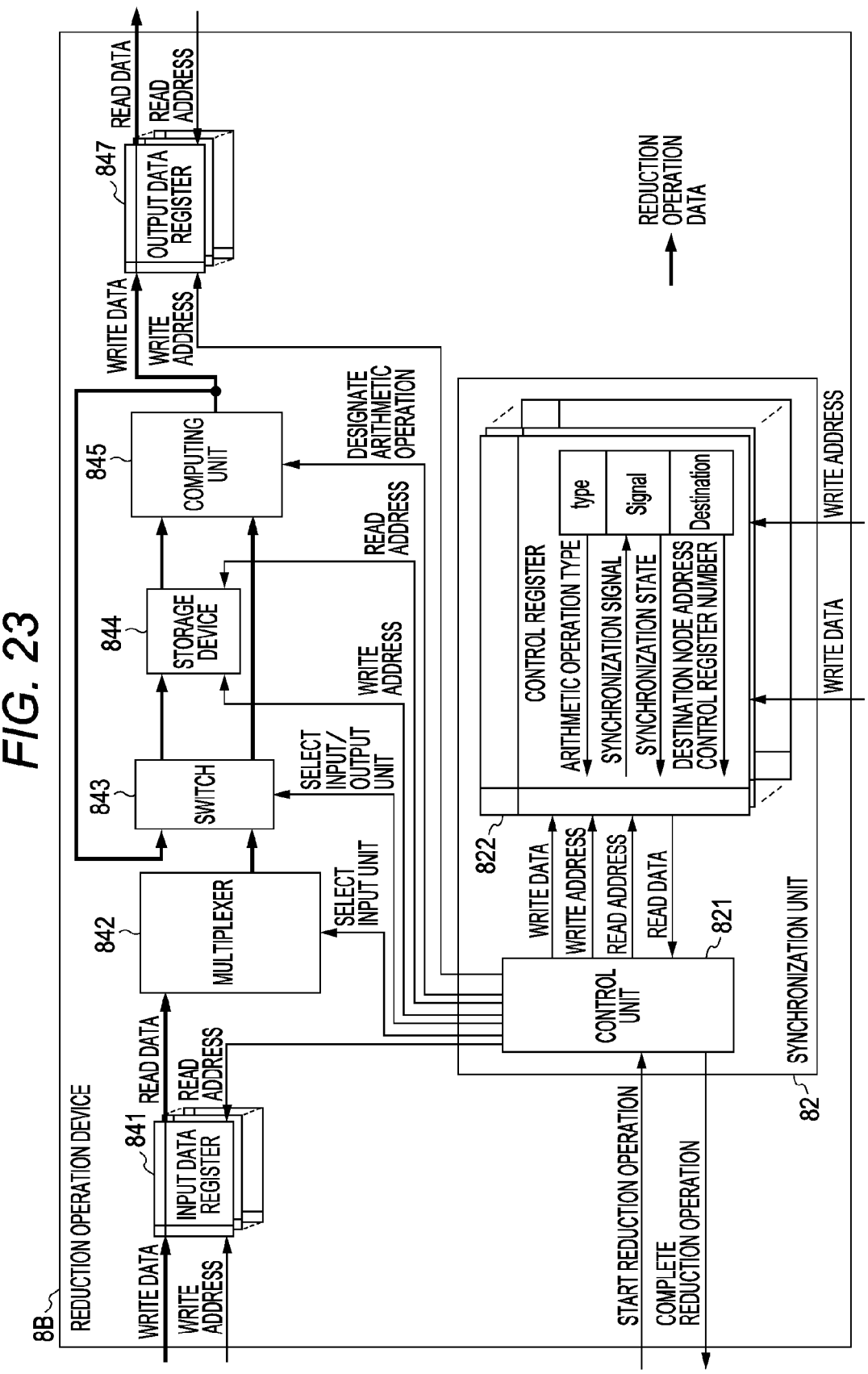
FIG. 23 is a diagram illustrating an embodiment of a reduction operation unit.

FIG. 23 illustrates a reduction operation device according to the eighth embodiment in the computer system in FIG. 21.

In the eighth embodiment, the reduction operation device 8B is arranged independently of each of the processor cores 10. The reduction operation device 8B does not include the receiving device 81 and the transmitting device 83 as described in the first embodiment. More specifically, the reduction operation device 8B according to the eighth embodiment has a configuration obtained by omitting the receiving device 81 and the transmitting device 83 in the reduction operation device 8 according to the second embodiment illustrated in FIG. 10. In addition, since the reduction operation device 8B according to the eighth embodiment performs the same arithmetic operation in a certain reduction operation, the reduction operation device 8B has a configuration obtained by omitting the demultiplexer 846 in the reduction operation device 8 illustrated in FIG. 10. On the other hand, the computer 845 of the reduction operation device 8B according to the eighth embodiment has the same configuration as that of the computer 845 of the reduction operation device 8 in FIG. 10.

In the eighth embodiment, for each of the processor cores 10, the control register 822 used by the processor core 10 is predetermined. In this manner, when a reduction operation realized by barrier synchronization is executed by the four processor cores 10, a reduction operation realized by barrier synchronization can be performed by the same manner as that in FIG. 12 in the second embodiment. As a result, as in a configuration in which the reduction operation device 8B is arranged in the processor core 10, a reduction operation realized by barrier synchronization can be performed.

In the eighth embodiment, broadcasting between the plurality of reduction operation devices 8B is not necessary. According to embodiments of the present invention, in a barrier synchronization apparatus and a data processing apparatus and method which performs barrier synchronization, since a second synchronization signal is transmitted after synchronization is made with reference to a first synchronization signal, barrier synchronization can be performed.

Depending on the setting conditions, in the barrier synchronization apparatus, destinations of signals representing that processes arrives at a barrier point every stage can be changed. In this manner, the use of software to execute a destination changing operation can be eliminated. Therefore, the use of a CPU and a memory to execute the changing operation can be eliminated, and data transfer on every stage can be eliminated.

Since designations of signals representing processes arrive at a barrier point on every stage are set in the barrier synchronization apparatus, the necessity of changing the destinations by, for example, a switch can be eliminated. As a result, for example, even though each nodes including the barrier synchronization apparatus are connected to each other by a network, a network configuration between nodes can be avoided from being limited to a multi-level connection network.

Since the barrier synchronization apparatus can synchronize n first synchronization signals, a plurality of barrier synchronization operations for different nodes can be simultaneously performed.

According to embodiments of the present invention, in a reduction operation device, a data processing apparatus and method which performs a reduction operation to perform barrier synchronization, the same effect as that of the above barrier synchronization apparatus can be obtained. In this manner, the reduction operation can be performed while making barrier synchronization.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A barrier synchronization apparatus comprising:
a receiving device which transmits a first synchronization signal to a synchronization device, when the first synchronization signal in which a transmission destination is set in advance in a previous stage according to setting conditions including an algorithm of the barrier synchronization and an execution condition is received;
the synchronization device synchronizes n (n is a positive integer) first synchronization signals which are set in advance according to the setting conditions and, after the synchronization is established, designates transmission of m (m is a positive integer) second synchronization signals in which transmission destinations are set in advance according to the setting conditions; and
a transmitting device which transmits the second synchronization signals to m transmission destinations set in advance, when a transmission designation information indicating the transmission designation is received from the synchronization device.

2. The barrier synchronization apparatus according to claim 1, wherein
the algorithm of the barrier synchronization is a butterfly algorithm.

3. The barrier synchronization apparatus according to claim 1, wherein
the algorithm of the barrier synchronization is a dissemination algorithm.

4. The barrier synchronization apparatus according to claim 1, wherein
the algorithm of the barrier synchronization is a pairwise exchange with recursive doubling algorithm.

5. The barrier synchronization apparatus according to claim 1, wherein
the synchronization device synchronizes a plurality of pairs of synchronization signals, each pair of which includes the n first synchronization signals.

6. A barrier synchronization process system comprising:
an input device which inputs setting conditions including an algorithm of barrier synchronization and execution conditions;
a barrier synchronization apparatus which performs barrier synchronization; and
a setting processor which sets a transmission destination of a first synchronization signal and a transmission destination of a second synchronization signal in the barrier synchronization apparatus according to the setting conditions inputted from the input device in the barrier synchronization apparatus, wherein
the barrier synchronization apparatus further includes:
a receiving device which transmits the first synchronization signal to a synchronization device, when the first synchronization signal in which the transmission destination is set in advance in a previous stage according to the setting conditions is received;
a synchronization device which synchronizes the n (n is a positive integer) first synchronization signals which are set in advance according to the setting conditions and, after the synchronization is established, designates transmission of m (m is a positive integer) second synchronization signals in which transmission destinations are set in advance according to the setting conditions; and
a transmitting device which transmits the second synchronization signals to the m transmission destinations set in advance, when a designation of the transmission is received from the synchronization device.

7. A method of barrier synchronization, comprising:
inputting setting conditions including an algorithm of barrier synchronization and execution conditions;
setting a transmission destination of a first synchronization signal and a transmission destination of a second synchronization signal in barrier synchronization according to the input setting conditions;
transmitting the first synchronization signal when the first synchronization signal in which the transmission destination is set in advance in a previous stage according to the inputted setting conditions is received;
synthesizing the n (n is a positive integer) first synchronization signals set in advance according to the setting conditions;
designating transmission of m (m is a positive integer) second synchronization signals in which transmission destinations are set in advance according to the setting conditions after the synchronization is established; and
transmitting the second synchronization signals to the m transmission destinations set in advance when a transmission designation of the second synchronization signals is received.

8. The barrier synchronization method according to claim 7, comprising:
designating a predetermined reduction operation after synchronization between the n first synchronization signals is established; and
performing the reduction operation set in advance when a designation of the reduction operation is received.

9. The barrier synchronization apparatus according to claim 1, wherein:
the synchronization device further designates a predetermined reduction operation after the synchronization of the n first synchronization signals is established;
the transmitting device further includes
a storage device which stores input data, and
a computer which performs the reduction operation set in advance by using the data stored in the storage device when a designation of the predetermined reduction operation is received from the synchronization device.

10. The barrier synchronization system according to claim 6, wherein
the barrier synchronization apparatus performs a reduction operation while making barrier synchronization between processes,
the setting processor sets a transmission destination of the first synchronization signal and a transmission destination of the second synchronization signal in the reduction operation device according to the setting conditions inputted from the input device in the reduction operation device,
the synchronization device of the barrier synchronization apparatus designates a predetermined reduction operation after synchronization of the n first synchronization signals is established,
wherein the barrier synchronization apparatus further includes
a storage device which stores input data, and
a computer which performs the reduction operation set in advance by using the data stored in the storage device when a designation of the predetermined reduction operation is received from the synchronization device.

\* \* \* \* \*

UNITED STATES PATENT AND TRADEMARK OFFICE
CERTIFICATE OF CORRECTION

| | | |
|---|---|---|
| PATENT NO. | : 8,654,798 B2 | Page 1 of 1 |
| APPLICATION NO. | : 12/582119 | |
| DATED | : February 18, 2014 | |
| INVENTOR(S) | : Hiramoto et al. | |

It is certified that error appears in the above-identified patent and that said Letters Patent is hereby corrected as shown below:

On the Title Page Item [56] (OTHER PUBLICATIONS), Line 1, Delete "Algorithems" and insert -- Algorithms --, therefor.

Signed and Sealed this
Twenty-seventh Day of May, 2014

Michelle K. Lee
*Deputy Director of the United States Patent and Trademark Office*